US012774985B2

(12) United States Patent
Boudries et al.

(10) Patent No.: US 12,774,985 B2
(45) Date of Patent: Oct. 27, 2026

(54) CHEMICAL TRACE DETECTION SYSTEM

(71) Applicant: Leidos Security Detection & Automation, Inc., Tewksbury, MA (US)

(72) Inventors: Hacene Boudries, Andover, MA (US); Troy Velazquez, Salem, NH (US); Anatoly Lazarevich, Needham, MA (US); Dmitriy Ivashin, Peabody, MA (US); Andrew Anderson, Westford, MA (US)

(73) Assignee: Leidos Security Detection & Automation, Inc., Tewksbury, MA (US)

( * ) Notice: Subject to any disclaimer, the term of this patent is extended or adjusted under 35 U.S.C. 154(b) by 1211 days.

(21) Appl. No.: 17/727,969

(22) Filed: Apr. 25, 2022

(65) Prior Publication Data

US 2022/0276202 A1 Sep. 1, 2022

Related U.S. Application Data

(62) Division of application No. 16/119,472, filed on Aug. 31, 2018, now Pat. No. 11,313,833.

(51) Int. Cl.
*G01N 27/622* (2021.01)
*G01N 27/626* (2021.01)
(Continued)

(52) U.S. Cl.
CPC ......... *G01N 27/622* (2013.01); *G01N 27/626* (2013.01); *G01N 27/68* (2013.01); *H01J 49/0031* (2013.01); *H01J 49/004* (2013.01)

(58) Field of Classification Search
CPC .... G01N 27/622; G01N 27/626; G01N 27/68; H01J 49/0031; H01J 49/004
See application file for complete search history.

(56) References Cited

U.S. PATENT DOCUMENTS 4,313,739 A 2/1982 Douglas-Hamilton
5,401,962 A 3/1995 Ferran
(Continued)

FOREIGN PATENT DOCUMENTS

CN 103512947 A 1/2014
CN 103512947 B 7/2015
(Continued)

OTHER PUBLICATIONS

Great Britain Office Action for Application No. GB1912396.7, dated Feb. 27, 2020, 8 pages.
(Continued)

*Primary Examiner* — Andrew Smyth
(74) *Attorney, Agent, or Firm* — McCarter & English, LLP

(57) ABSTRACT

A chemical trace detection system includes: a drift tube; a detector disposed within the drift tube; a voltage source to produce an electrical field in the drift tube; an ionizer to establish an ionization region adjacent to the electrical field; and a desorber including a sample holder to hold a sample in or adjacent to the ionization region and a sample heater to desorb particles of the sample held in the sample holder such that the desorbed particles are introduced directly into the ionization region from the sample holder to form ionized particles that are forced toward the detector by the electrical field. A regenerable dryer assembly for supplying dry drift gas to an ion mobility spectrometer is also provided that includes a regenerable dessicant material.

18 Claims, 17 Drawing Sheets

(51) Int. Cl.
*G01N 27/68* (2006.01)
*H01J 49/00* (2006.01)

(56) References Cited

U.S. PATENT DOCUMENTS

| | | | |
|---|---|---|---|
| 5,405,781 | A | 4/1995 | Davies et al. |
| 5,613,294 | A | 3/1997 | Ferran |
| 6,291,821 | B1 | 9/2001 | Danylewych-May et al. |
| 6,815,670 | B2 | 11/2004 | Jenkins et al. |
| 6,828,795 | B2 | 12/2004 | Krasnobaev et al. |
| 6,861,646 | B2 | 3/2005 | Motchkine et al. |
| 6,870,155 | B2 | 3/2005 | Krasnobaev et al. |
| 6,888,128 | B2 | 5/2005 | Krasnobaev et al. |
| 7,098,672 | B2 | 8/2006 | Belyakov et al. |
| 7,244,288 | B2 | 7/2007 | Belyakov et al. |
| 7,574,930 | B2 | 8/2009 | Bunker |
| 7,576,320 | B2 | 8/2009 | Bunker et al. |
| 7,709,788 | B2 | 5/2010 | Geraghty et al. |
| 7,820,979 | B2 | 10/2010 | Belyakov et al. |
| 7,994,453 | B2 | 8/2011 | Richards et al. |
| 8,122,756 | B2 | 2/2012 | Bunker |
| 8,173,959 | B1 | 5/2012 | Boumsellek et al. |
| 8,296,078 | B1 | 10/2012 | Pfeifer et al. |
| 8,353,223 | B2 | 1/2013 | Bunker |
| 8,469,295 | B2 | 6/2013 | Bunker et al. |
| 9,006,678 | B2 | 4/2015 | Ivashin et al. |
| 9,067,219 | B2 | 6/2015 | Bunker et al. |
| 9,068,943 | B2 | 6/2015 | Ivashin et al. |
| 9,070,542 | B2 | 6/2015 | Ivashin et al. |
| 9,267,920 | B2 | 2/2016 | Anderson et al. |
| 9,310,335 | B2 | 4/2016 | Boumsellek et al. |
| 9,395,333 | B2 | 7/2016 | Ivashin et al. |
| 11,313,833 | B2 | 4/2022 | Boudries et al. |
| 2002/0134933 | A1* | 9/2002 | Jenkins ................ G01N 27/622 250/282 |
| 2005/0230615 | A1 | 10/2005 | Furutani et al. |
| 2007/0176092 | A1 | 8/2007 | Miller et al. |
| 2007/0256474 | A1 | 11/2007 | Paakkanen et al. |
| 2010/0127163 | A1 | 5/2010 | Zhdaneev et al. |
| 2011/0210244 | A1* | 9/2011 | Wu ...................... G01N 27/623 250/283 |
| 2012/0068061 | A1 | 3/2012 | Griffin et al. |
| 2012/0068063 | A1 | 3/2012 | Fernandez et al. |
| 2012/0326023 | A1 | 12/2012 | Kozole |
| 2015/0069254 | A1 | 3/2015 | Fernandez et al. |
| 2015/0249001 | A1 | 9/2015 | Piper |
| 2015/0362228 | A1 | 12/2015 | Ivashin et al. |
| 2019/0391114 | A1 | 12/2019 | Arnold et al. |
| 2020/0284757 | A1 | 9/2020 | Boudries et al. |

FOREIGN PATENT DOCUMENTS

| | | | |
|---|---|---|---|
| EP | 2637013 | A2 | 9/2013 |
| EP | 3029714 | A1 | 6/2016 |
| EP | 3029714 | A4 | 8/2017 |
| WO | 2008/074986 | A1 | 6/2008 |
| WO | 2014/045057 | A2 | 3/2014 |

OTHER PUBLICATIONS

Great Britain Office Action for Application No. GB2007695.6, dated Jun. 11, 2020, 5 pages.
Great Britain Office Action for Application No. GB1912396.7, dated Oct. 16, 2020, 3 pages.
Great Britain Office Action for Application No. GB1912396.7, dated Feb. 5, 2021, 4 pages.
Great Britain Office Action for Application No. GB2201901.2, dated Feb. 23, 2022, 3 pages.
Great Britain Office Action for Application No. GB2007695.6, dated Jan. 13, 2021, 2 pages.
Great Britain Office Action for Application No. GB1912396.7, dated Oct. 18, 2021, 5 pages.

* cited by examiner

CHEMICAL TRACE DETECTION SYSTEM

CROSS-REFERENCE TO RELATED APPLICATION

This application is a divisional of U.S. patent application Ser. No. 16/119,472, filed Aug. 31, 2018, which is incorporated by reference herein in its entirety. This application is also related to U.S. patent application Ser. No. 16/880,643, filed May 21, 2020, the entire contents of this application being incorporated herein by reference.

TECHNICAL FIELD

The present disclosure relates to chemical trace detection systems and, more particularly, to chemical trace detection systems that incorporate ion mobility spectrometers.

BACKGROUND

Chemical trace detection systems are commonly used in various settings and applications to detect the presence of one or more chemicals, compounds, or materials of interest. Chemical trace detection systems are often utilized at security checkpoints to detect illicit substances, such as bomb-making materials or drugs, and to prevent such substances from passing the security checkpoint.

Many chemical trace detection systems operate utilizing an ion mobility spectrometry (IMS) technique. During IMS, the molecules of a sample are desorbed and ionized before traveling through a drift tube towards a detector. The ionized molecules are forced by an electric field through uncharged drift gas molecules while traveling through the drift tube to the detector. When the MIS device uses ambient air as the drift gas, the ambient air is de-humidified by, for example, a dryer assembly to reduce the likelihood of water molecules in the air associating with the ionized particles and altering the mobility of the ionized particles, affective the accuracy of the system. The detector can determine what substances are present in the sample based on the characteristic mobility of molecules through the drift tube.

SUMMARY

The present disclosure provides chemical trace detection systems with a desorber for directly introducing desorbed particles of a sample into an ionization region. The present disclosure also provides dryer assemblies with a regenerable desiccant material for the chemical trace detection systems.

In some exemplary embodiments disclosed herein, a chemical trace detection system includes: a drift tube; a detector disposed within the drift tube; a voltage source to generate an electrical field in the drift tube; an ionizer to establish an ionization region adjacent to the electrical field; and a desorber including a sample holder to hold a sample in or adjacent to the ionization region and a sample heater to desorb particles of the sample held in the sample holder such that the desorbed molecules are introduced directly into the ionization region from the sample holder to form ionized molecules that are forced toward the detector by the electrical field.

In some exemplary embodiments disclosed herein, a desorber includes: a desorber body removably coupleable to a sample inlet of a chemical trace detection system; a sample holder connected to the desorber body; a sample trap held in the sample holder; and a sample heater carried by the desorber body to desorb a sample contained by the sample trap.

In some exemplary embodiments disclosed herein, a method for detecting one or more substances with a chemical trace detection system includes: placing a sample in a sample holder; desorbing at least a portion of the sample in the sample holder to form desorbed sample molecules; introducing the desorbed sample molecules directly into an ionization region from the sample holder to form ionized molecules; and forcing, with an electrical field, the ionized molecules to a detector.

In some exemplary embodiments disclosed herein, a chemical trace detection system includes: an ion mobility spectrometer to detect one or more substances of interest when supplied with dry drift gas; and a regenerable dryer assembly fluidly coupled with the ion mobility spectrometer to supply dry drift gas to the ion mobility spectrometer. The regenerable dryer assembly includes: a pump; a desiccant chamber fluidly coupled to the pump and holding a regenerable desiccant material to produce dry drift gas from gas flowing through the desiccant chamber. A heater heats the regenerable desiccant material during a regeneration protocol, and a valve between the desiccant chamber and the ion mobility spectrometer switchable between an operating state and a regenerating state. The valve fluidly couples the desiccant chamber to the ion mobility spectrometer in the operating state and fluidly uncoupling the desiccant chamber from the ion mobility spectrometer in the regenerating state. The valve is in the regenerating state during the regeneration protocol to prevent the supply of dry drift gas to the ion mobility spectrometer.

In some exemplary embodiments disclosed herein, a method is provided for operating a chemical trace detection system including an ion mobility spectrometer supplied with dry drift gas by a regenerable dryer assembly. The regenerable dryer assembly includes a desiccant chamber holding a regenerable desiccant material. The method includes: supplying dry drift gas to the ion mobility spectrometer from the regenerable dryer assembly; initiating a regeneration protocol, the regeneration protocol including: stopping the supplying of dry drift gas to the ion mobility spectrometer; heating the regenerable desiccant material to a regeneration temperature; flowing gas through the desiccant chamber to force released water from the regenerable desiccant material out of the chemical trace detection system; and cooling the regenerable desiccant material to an operating temperature. The method further includes terminating the regeneration protocol resuming supplying dry drift gas to the ion mobility spectrometer from the regenerable dryer assembly following termination of the regeneration protocol.

BRIEF DESCRIPTION OF THE FIGURES

The foregoing and other objects, features and advantages of the exemplary embodiments will be more fully understood from the following description when read together with the accompanying drawings, in which.

Figure 1A:
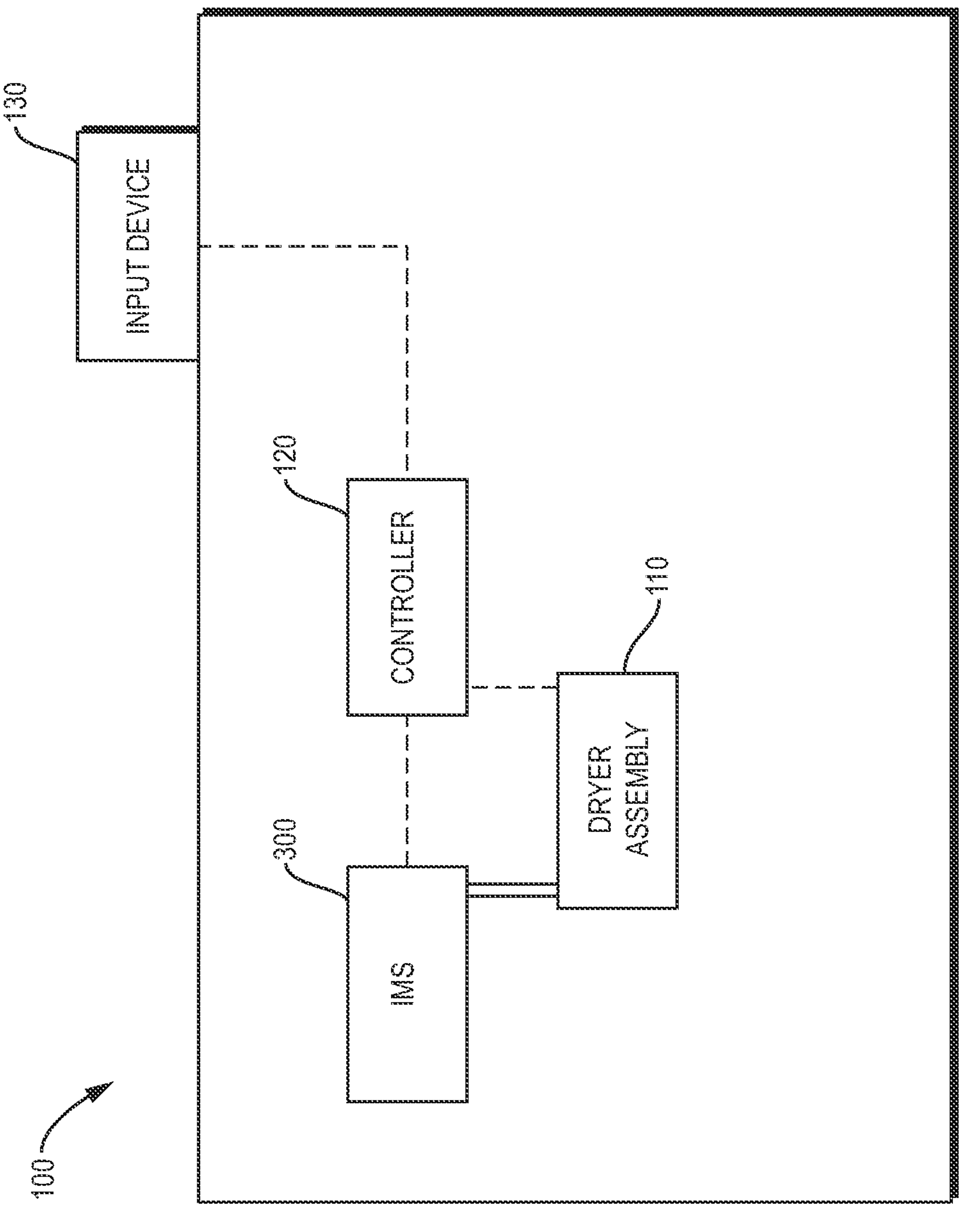
FIG. 1A is a schematic view of an exemplary embodiment of a chemical trace detection system as taught herein.
Figure 1B:
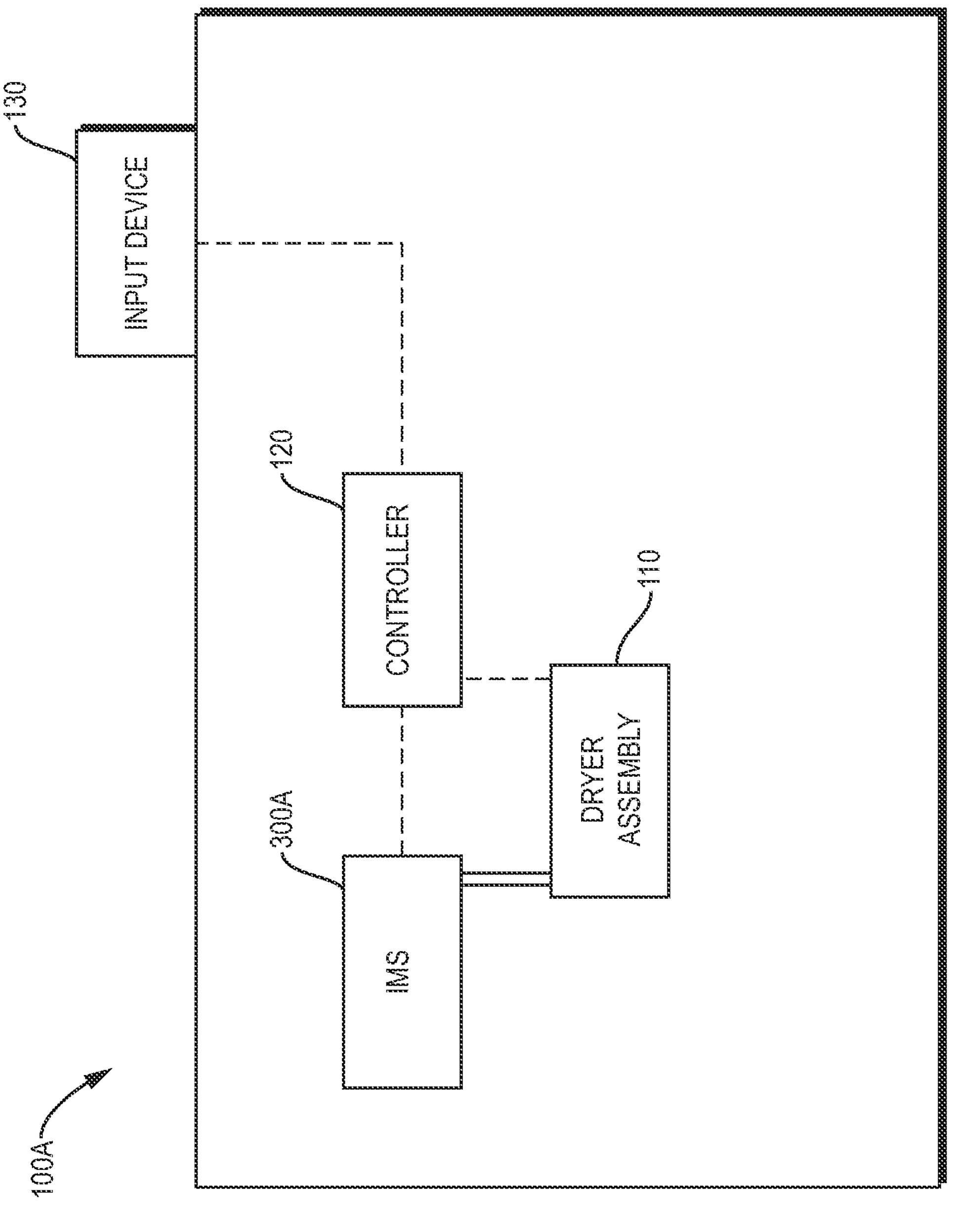
FIG. 1B is a schematic view of an alternative embodiment of a chemical trace detection system that is similar to the chemical trace detection system shown in FIG. 1A, but includes an ion mobility spectrometer with an ionization chamber coupled to an open end of a drift tube.
Figure 11:
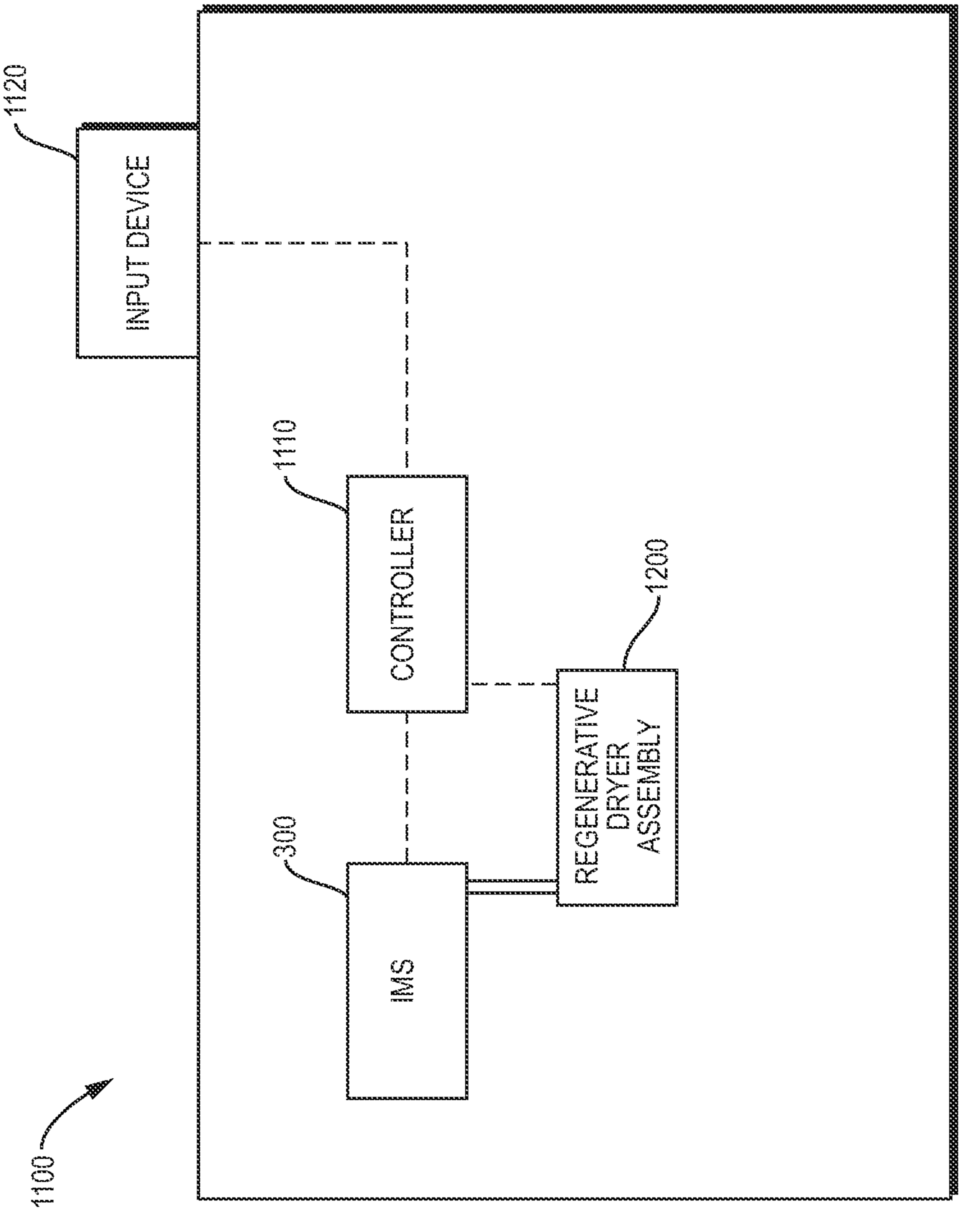
Figure 12:
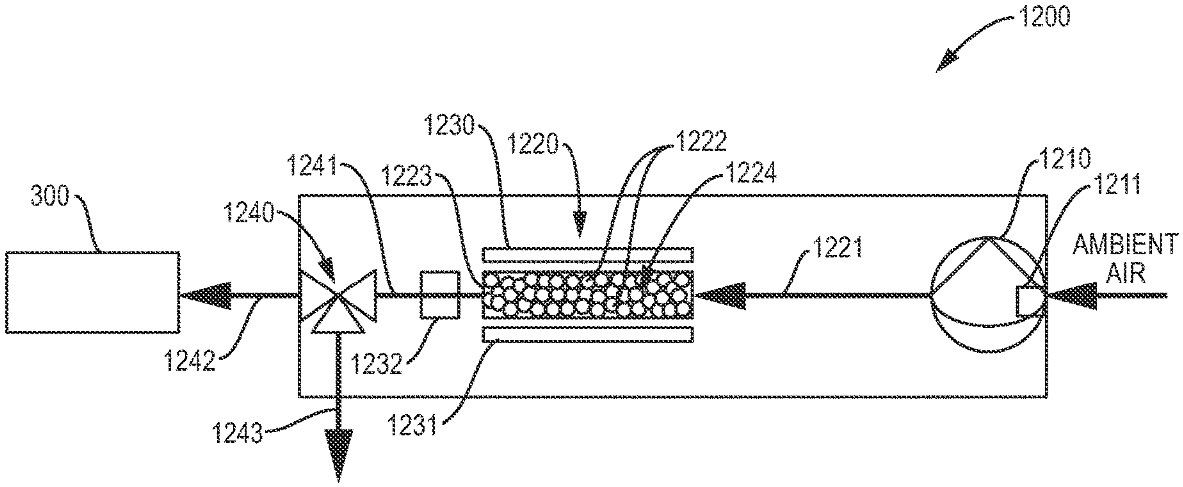
Figure 13:
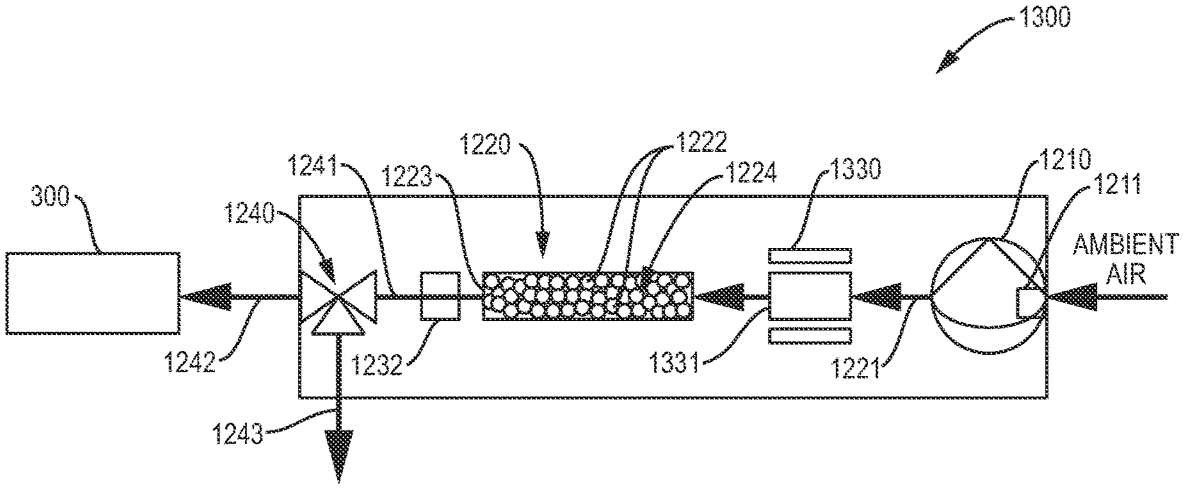
Figure 14:
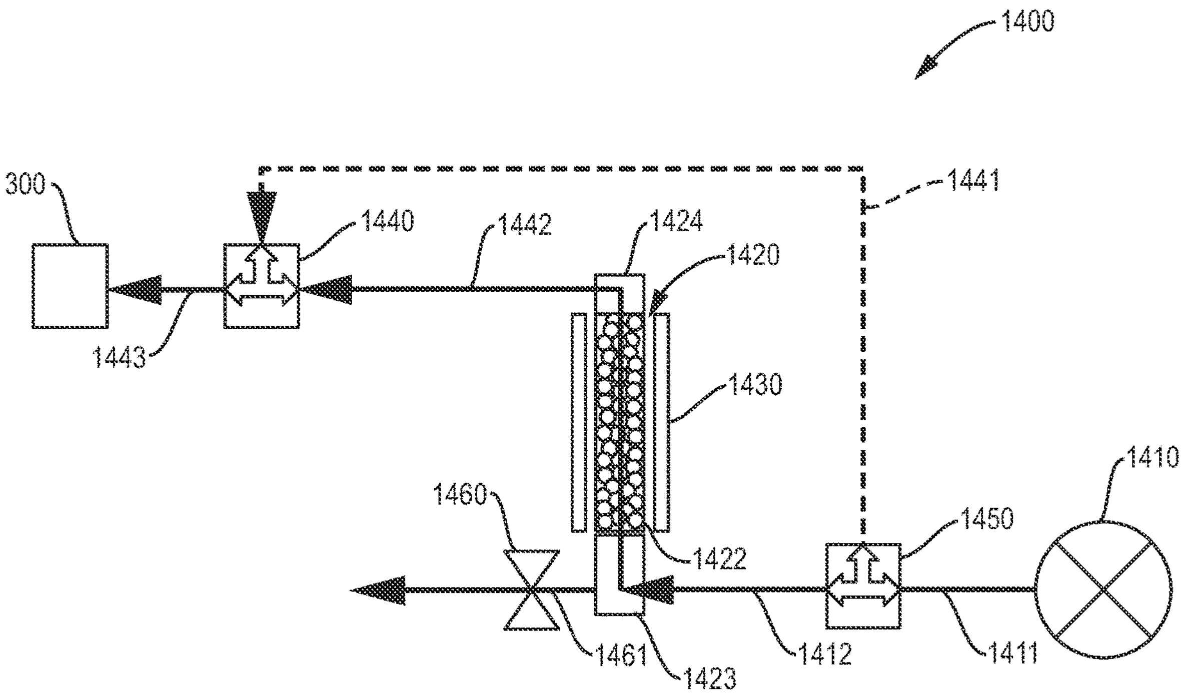
Figure 15:
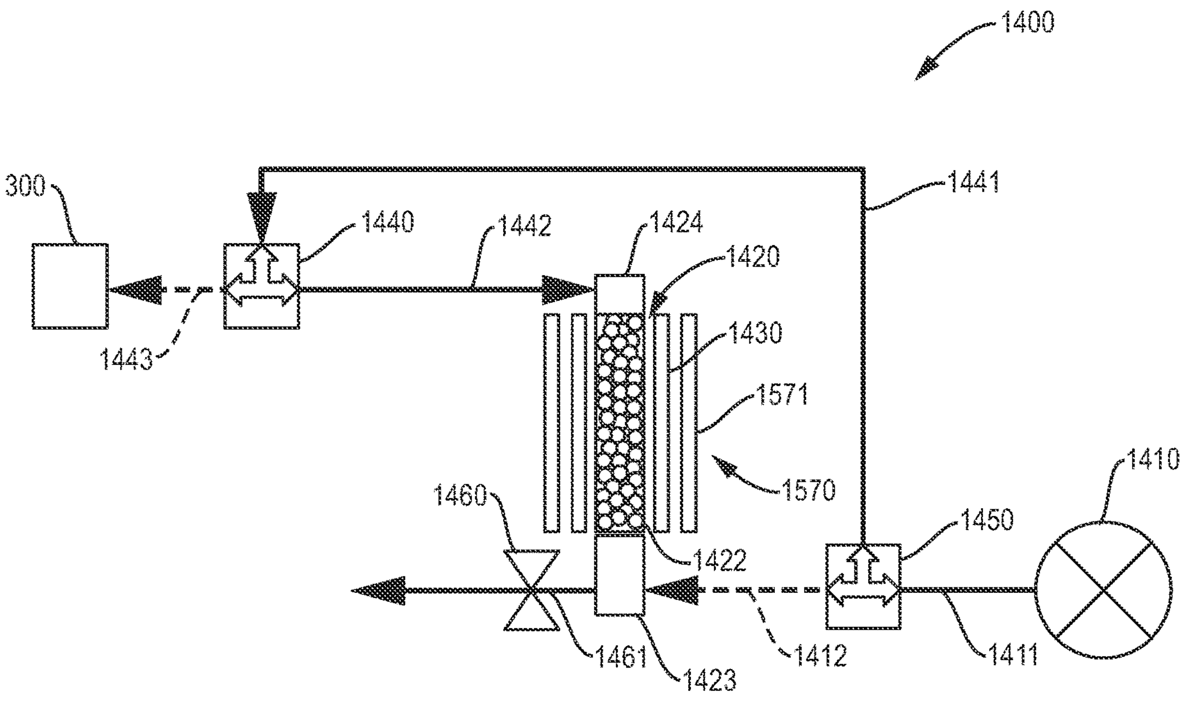
Figure 16:
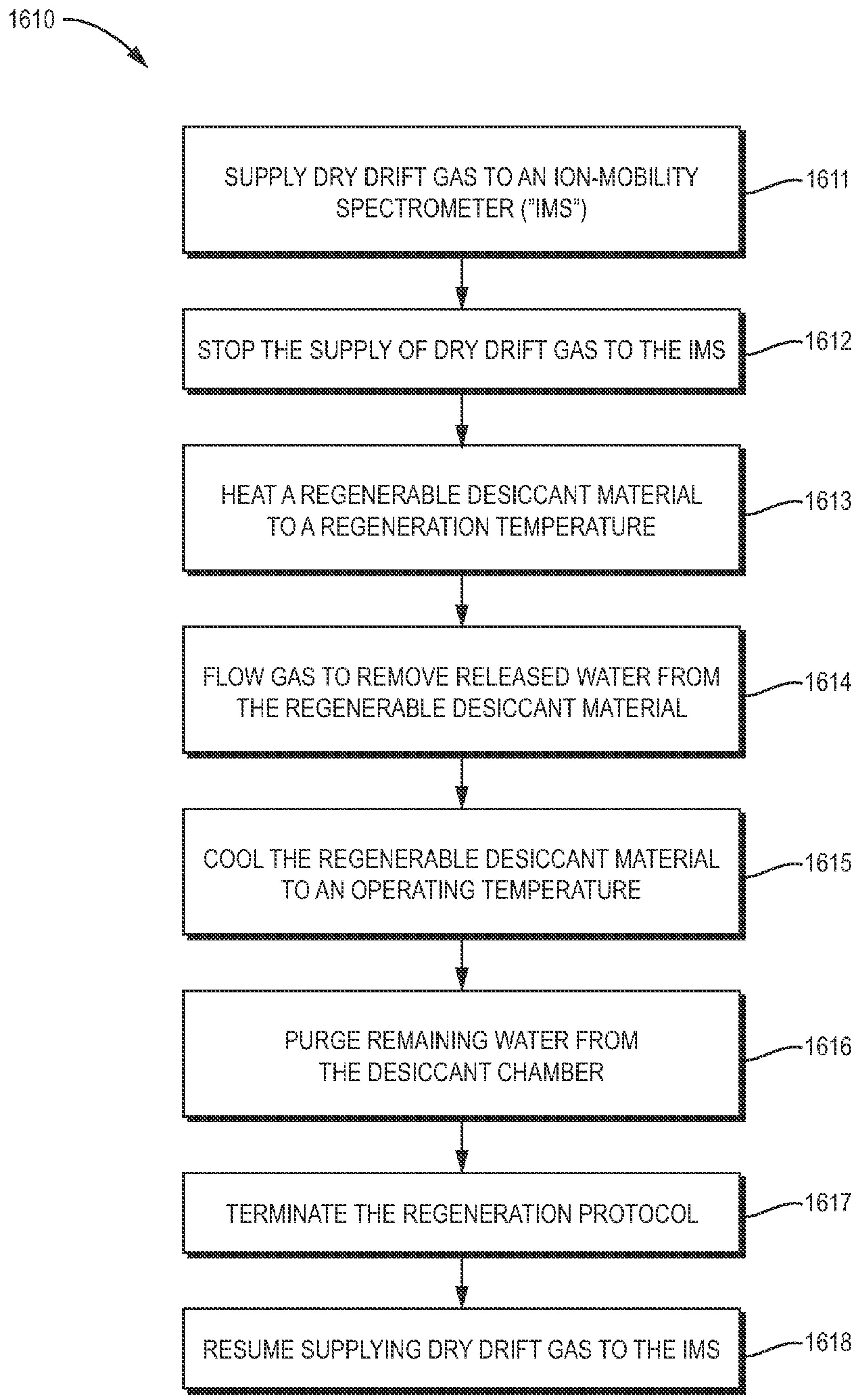

FIG. II is a schematic view of another exemplary embodiment of a chemical trace detection system as taught herein;

FIG. 12 is a schematic view of an exemplary embodiment of a regenerable dryer assembly that can be incorporated in the chemical trace detection systems shown in FIGS. 1A, 1B, and 11;

FIG. 13 is a schematic view of another exemplary embodiment of a regenerable dryer assembly that can be incorporated in the chemical trace detection systems shown in FIGS. 1A, 1B, and 11;

FIG. 14 is a schematic view of another exemplary embodiment of a regenerable dryer assembly in a forward-flow operating mode;

FIG. 15 is a schematic view of the regenerable dryer assembly illustrated in FIG. 14 after switching to a reverse-flow regeneration mode; and FIG. 16 is a flow chart illustrating an exemplary embodiment of a method of operating a chemical trace detection system.

DETAILED DESCRIPTION

The present disclosure provides systems and methods for detecting various chemicals and compounds in samples. In some embodiments, the system includes an ion mobility spectrometer (MIS) with a desorber for directly introducing desorbed sample vapors, which include sample molecules, into an ionization region to produce ionized molecules, which are forced toward a detector by a generated electrical field and experience little dilution during ionization. The desorbed molecules may be directly introduced into an ionization region inside a drift tube volume by, for example, eliminating a transfer line or other similar element flowably coupling a desorber, which is exterior to the drift tube volume, and the ionization region to allow sample particles to desorb directly into the ionization region from the external desorber. In some embodiments, the desorbed particles may be directly introduced into the ionization region within an ionization chamber coupled to a drift tube, with the desorber being located in close proximity to the ionization region so the sample particles desorb directly into the ionization region. In some embodiments, the desorbed particles may be directly introduced into the ionization region using a desorber, which may be configured as a pen-like device or have a pen-like holder, that holds a sample in or adjacent to the ionization region such that the sample particles desorb directly into the ionization region from the pen like device. In some embodiments, the pen-like device carries an element to desorb the molecules. In some embodiments, the pen-like device is placed in close proximity to a heater, which may be adjacent to the ionization region, to desorb the molecules.

In some embodiments, the system includes a regenerable dryer assembly with a regenerable desiccant material to provide dry drift gas to the IMS and regenerate during a regeneration protocol to reduce the IMS' need for consumables.

In some exemplary embodiments, and referring now to FIG. 1A, a chemical trace detection system 100 as taught herein includes an ion mobility spectrometer (IMS) 300 supplied with drift gas from a drift gas supply, which may be a dryer assembly 110, fluidly coupled with the INIS 300. In some exemplary embodiments, both the IMS 300 and the dryer assembly 110 are controlled by a common system controller 120 that is operatively coupled to an input device 130 such as, for example, a touch screen device, keyboard, mouse, etc., to allow a user to control operation of the chemical trace detection system 100. In some exemplary embodiments, the IMS 300 and the dryer assembly 110 each have a respective controller to control respective functions.

Figure 2:
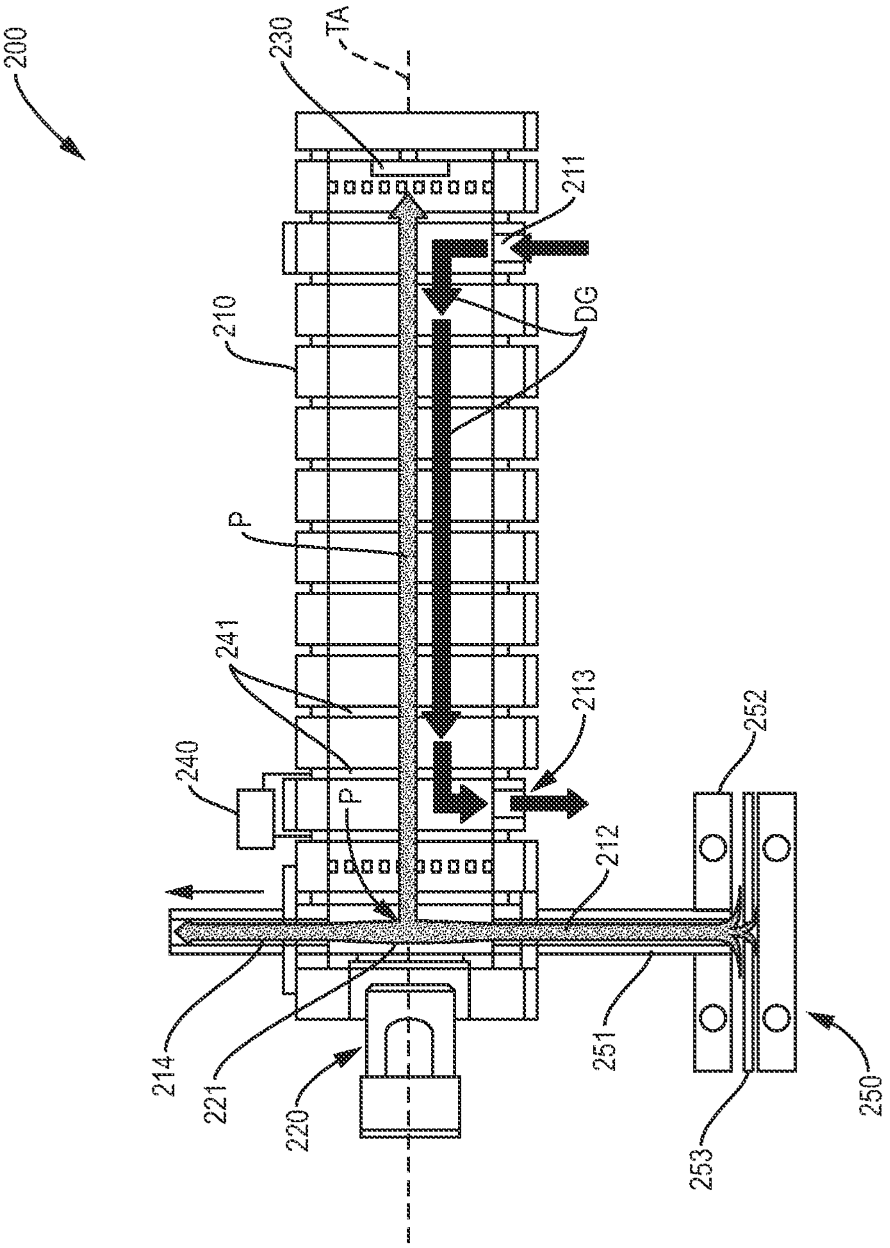
FIG. 2 (PRIOR ART)
FIG. 2 is a cross-sectional view of a prior art ion mobility spectrometer.

Referring now to FIG. 2, a prior art IMS 200 is illustrated to demonstrate general operating principles behind IMS devices. The IMS 200 includes, generally, a drift tube 210 with a drift gas inlet 211 to receive de-humidified air, for example, from the dryer assembly 110 and a sample inlet 212, an ionizer 220 disposed within the drift tube 210 and directed at a detector 230 also disposed within the drift tube 210, a voltage source 240 to generate an electrical field in the drift tube 210, and a sample desorber 250 coupled to the sample inlet 212 by a transfer line 251. As can be seen, the drift tube 210 may also have a pair of outlets 213, 214 formed in the drift tube 210 that allow, for example, outflow of drift gas and vaporized sample, respectively. The drift gas inlet 211 can receive drift gas, such as de-humidified air, from a dryer assembly or other source.

The ionizer 220 is disposed within the drift tube 210 to establish an ionization region 221 within the drift tube 210. The ionizer 220 may be for, example, a non-radioactive spark ionizer as disclosed in U.S. Pat. No. 9,310,335 to Boumsellek et al., which is incorporated in its entirety herein by reference. The ionizer 220 is longitudinally aligned with the detector 230 to define a molecule cloud path therebetween, which is represented by arrow P. The sample desorber 250 is coupled to the sample inlet 212 by a transfer line 251 and includes a sample holder 252 to hold a sample trap 253 containing a sample. The sample in the sample trap 253 is heated to desorb the particles of the sample, which are carried by airflow through the transfer line 251 to the ionization region 221 where some of the desorbed particles are ionized. The voltage source 240 generates an electrical field in the drift tube 210 that forces the ionized molecules toward the detector 230 along the ion flow path P. The voltage source 240 can be electrically coupled to a series of ring electrodes 241 that are aligned with one another in the drift tube 210 along a tube axis TA to produce and maintain a gradient electric field. As ionized molecules travel along the particle flow path P due to the generated electrical field, the ionized molecules pass through a drift gas counter-flow, represented by arrow DG, from the drift gas inlet 211. The presence of various substances in the sample can be determined based on the speed at which the various ionized molecules travel through the drift tube 210, i.e., the mobility of the ions, with each substance having unique mobility characteristics.

One particular issue that has been found to occur when attempting to detect substances using the prior art IMS 200 is excessive sample loss and dilution, which can limit the ability of the prior art IMS 200 to detect small amounts of certain substances. It has been discovered that two different operation aspects are largely responsible for sample loss and dilution: 1) adsorption of desorbed particles from the sample desorber 250 to surfaces of the transfer line 251, resulting in fewer sample particles making it to the ionization region 221; and 2) dilution of the sample particles by the airflow volume carrying the particles through the transfer line 251. Another aspect that may limit the ability of the prior art IMS 200 to detect certain substances is incomplete ionization of desorbed sample particles passing through the ionization region 221. The incomplete ionization may be due to short residence time within the ionization region 221, excessively fast desorbed particle travel, sub-optimal overlap with the reactive ion volume within the ionization region 221, or both.

The losses and dilution of the desorbed sample particles during operation, as well as incomplete ionization, result in prior art IMS systems having substantial average sample losses. For instance, the fractional concentration of the vapor corresponding to 10 pg of substance in one cubic centimeter of ambient air is approximately 1 part per billion (ppb). When accounting for the internal volume of the sample desorber 250 and the volume of the transfer line 251 to the ionization region 221, the aforementioned concentration of the vapor may be reduced by up to two orders of magnitude to 100 parts per trillion (ppt). This reduction in concentration to the ppt range limits the substance detection thresholds to the nanogram range. To reliably detect one or more substances in the sample that are present only in the picogram range, such as 10 picograms, it is important to limit the losses and dilution of desorbed and ionized sample particles during operation.

Figure 3:
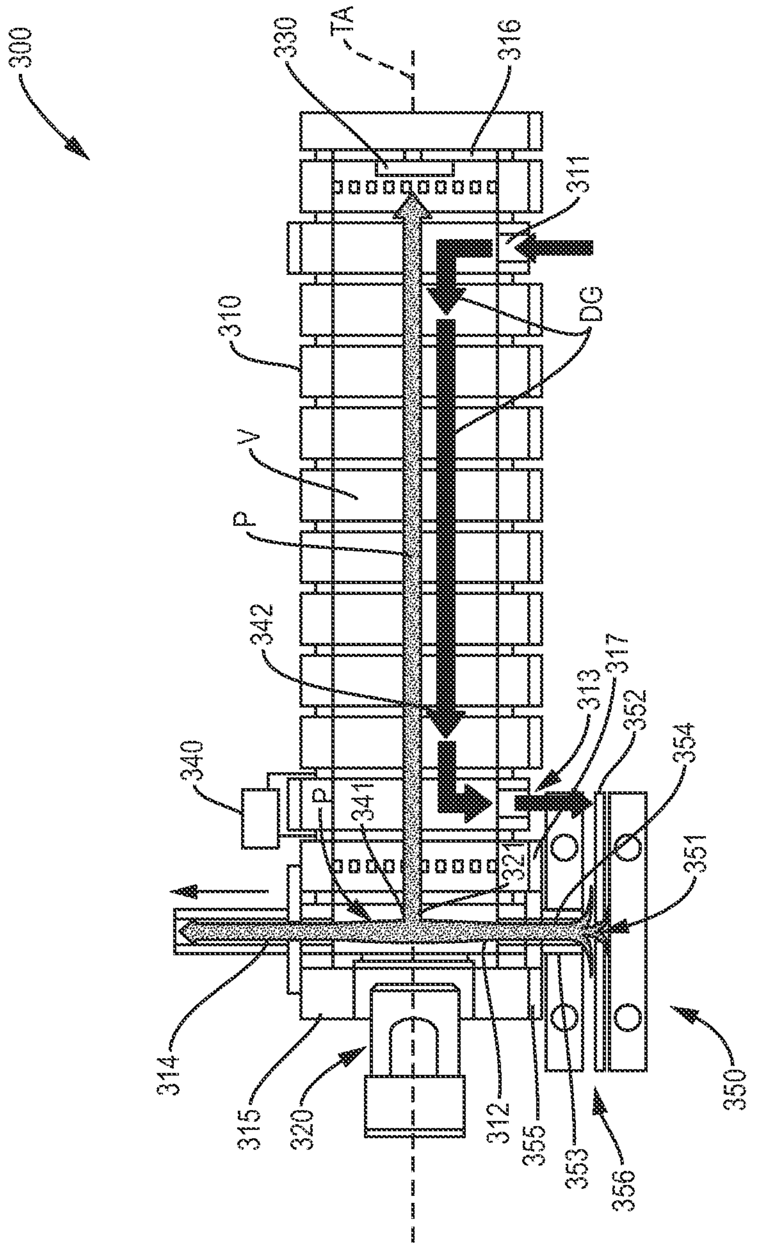
FIG. 3 is a cross-sectional view of an exemplary embodiment of an ion mobility spectrometer that can be incorporated in the chemical trace detection system shown in FIG. 1A.

To address the aforementioned issues, and referring now to FIG. 3, an exemplary embodiment of the IMS 300 is illustrated that includes a drift tube 310, a voltage source 340 to generate an electrical field within the drift tube 310, an ionizer 320 to generate an ionization region adjacent to the electrical field, a detector 330 in the drift tube 310, and a desorber 350. The drift tube 310 may include a drift gas inlet 311 coupled to a drift gas supply, such as a dryer assembly, and a sample inlet 312 to allow entry of a solid or desorbed sample into the drift tube 310, as will be described further herein. The drift tube 310 may also include a drift gas outlet 313 to allow drift gas escape and a vapor outlet 314 for vaporized sample to escape the drift tube 310.

The ionizer 320 establishes an ionization region 321 in the vicinity of the ionizer 320 to charge (ionize) desorbed vapors passing through the ionization region 321 during operation. In some exemplary embodiments, the ionizer 320 may be the previously described non-radioactive spark ionizer disclosed in U.S. Pat. No. 9,310,335. It should be appreciated that other configurations of ionizers may be incorporated in the IMS 300, including but not limited to: atmospheric pressure photoionizers, electrospray ionizers, and radioactive ionizers. In some exemplary embodiments, the ionizer 320 is disposed within the drift tube 310 and directed at the detector 330 to define a molecular cloud path therebetween, which is represented by arrow P. In some exemplary embodiments, the ionizer 320 is removably coupled to a first end 315 of the drift tube 310 to allow convenient removal and maintenance of the ionizer 320. The previously described vapor outlet 314 can be located near the ionization region 321 so desorbed particles that pass through the ionization region 321 without ionizing exit the drift tube 310, reducing fouling of the walls of the drift tube 310 by desorbed particles that adhere to the walls.

The detector 330 is disposed within the drift tube 310 and may be placed at a second end 316 of the drift tube 310 opposite the first end 315 with the ionizer 320. The detector 330 serves to collect ionized molecules that pass through the drift tube 310 and, based on the mobility of the collected ionized molecules, determine what substance(s) is present in the ionized molecules. Many different types of detectors for IMS systems are known, and it should be appreciated that any suitable detector may be incorporated in the IMS 300.

The voltage source 340 generates an electrical field 341 within the drift tube 310 during operation to force ionized molecules in the ionization region 321 to travel toward the detector 330 for detection. In this respect, the ionizer 320 is placed within the IMS 300 so the established ionization region 321 is adjacent to the generated electrical field 341 such that vaporized molecules ionized in the ionization region 321 are forced toward the detector 330 by the electrical field 341. In some exemplary embodiments, the voltage source 340 may be electrically coupled to a series of cathode rings 342 aligned with one another in the drift tube 310 along a tube axis TA of the drift tube 310 to produce a gradient electrical field across the length of the drift tube 310. Many different types of voltage source configurations for generating electrical fields in IMS systems are known, and it should be appreciated that any suitable voltage source or other electrical field generator may be incorporated in the IMS 300.

The desorber 350 is placed within the TMS 300 and includes a sample holder 351 to hold a sample 352 in or adjacent to the ionization region 321 and a sample heater 353 to heat the held sample 352 and desorb the particles of the sample 352. The sample 352 may be contained in a sample trap 356. While the desorber 350 is described herein as using thermal energy from an electrical heater to desorb the particles of the sample 352, other types of desorbers may be used. In some embodiments, the sample 352 is heated using a current of heated fluid, a laser, by infrared, etc. Further, while the desorber 350 is shown with a sample holder 351 and a sample heater 353 that are connected to one another, in some exemplary embodiments the sample holder 351 and sample heater 353 are separated, or readily separable, from one another.

As illustrated in FIG. 3, the sample holder 351 can be a channel formed in the desorber 350 that accepts the sample 352. Once the sample 352 is placed in the sample holder 351, the sample heater 353 can be activated to heat the sample 352 to a sufficiently high temperature that desorbs the particles of the sample 352. The desorbed particles flow through a desorber outlet 354 directly into the sample inlet 312 of the drift tube 310 and are introduced directly into the ionization region 321 where some of the desorbed particles are ionized and then forced by the electrical field 341 to the detector 330. The desorbed particles are "introduced directly" into the ionization region 321 in the sense that the desorbed particles travel into the ionization region 321 directly from the desorber 350 without passing through, for example, a transfer line or similar element.

As should be appreciated from FIG. 3, the desorbed particles encounter minimal surface area while traveling the short distance into the ionization region 321, encountering walls of the desorber 350 adjacent to the desorber outlet 354 and the wall of the drift tube 350 in which the sample inlet 312 is formed. Further, because the desorbed particles travel such a short distance to the ionization region 321, the desorbed particles do not need to be pulled or otherwise forced into the ionization region 321 by, for example, a vacuum formed in the drift tube 310. Rather, the desorbed molecules can travel into the ionization region 321 unassisted and have a longer residence time in the ionization region 321 to encourage more complete ionization of the desorbed particles. Thus, introducing the desorbed particles directly into the ionization region 321 can reduce the sample particle losses and dilution attributable to a transfer line while also increasing the residence time of the desorbed particles in the ionization region 321 to encourage more complete conversion of the desorbed particles into ionized molecules.

In some exemplary embodiments, the desorber 350 is disposed entirely outside of a tube volume V defined within the drift tube 310 while the ionizer 320 and collector 330 are disposed in the tube volume V. The desorber 350 may be removably mated to the drift tube 310 by mating a desorber attachment feature 355 with a tube attachment feature 317 of the sample inlet 312 to allow convenient removal and maintenance of the desorber 350. In some exemplary embodiments, the desorber attachment feature 355 and tube attachment feature 317 are mechanical attachment features that reversibly interlock with one another to form, for example, a bayonet connection or other type of attachment. Other types of attachment features that may be used include, but are not limited to, corresponding threadings, different types of male/female connectors, etc. In some exemplary embodiments, the sample heater 353 comprises a resistive heater that generates heat when electrically coupled to a current source, which may also be the previously described voltage source 340. The resistive heater may include, for example, carbon fiber with interwoven, coated heating elements or other types of resistive materials. In some exemplary embodiments, the sample heater is a variable frequency pulsed photon source directed at the sample holder 351 to heat a surface of the sample 352 that is facing the sampler heater and desorb particles of the sample 352.

In some exemplary embodiments, the sample heater 353 is configured to heat to operating temperatures higher than 500° C. in order to allow detection of substances with low vapor pressures. In some embodiments, the sample heater 353 is configured to heat to operating temperatures of between 500° C. and 1000° C., such as between 600° C. and 800° C. Because the desorbed particles are introduced directly into the ionization region 321, air flow is not required, but may still be used, to carry the desorbed particles from the sample holder 351 into the ionization region 321. In some exemplary embodiments, a lack of air flow carrying the desorbed particles to the ionization region 321 allows the sample heater 353 to heat to the desired operating temperature with reduced heat loss to convection, which can reduce the amount of time necessary for the sample heater 353 to reach the operating temperature from, for example, room temperature. In some exemplary embodiments, the sample heater 353 is configured to continuously heat the sample 352, heat the sample 352 in pulses, or both.

In some exemplary embodiments, the sample 352 is contained in the sample trap 356 before being introduced into the desorber 350. The sample trap 356 may be, for example, a swab, adsorbent pad, adsorbent sheet, or other material that can contain the sample 352. The sample 352 may be, for example, residue adsorbed to the sample trap 356 after the sample trap 356 has been rubbed against a surface to trap and contain the sample 352 for analysis. In this respect, the sample trap 356 may be porous, or otherwise configured, to increase the amount of available surface area to trap adsorbed residue. In some exemplary embodiments, the sample trap 356 comprises a polytetrafluoroethylene (PTFE) coated fiberglass material. In some exemplary embodiments, the sample trap 356 comprises a re-usable metallic medium.

Figure 4:
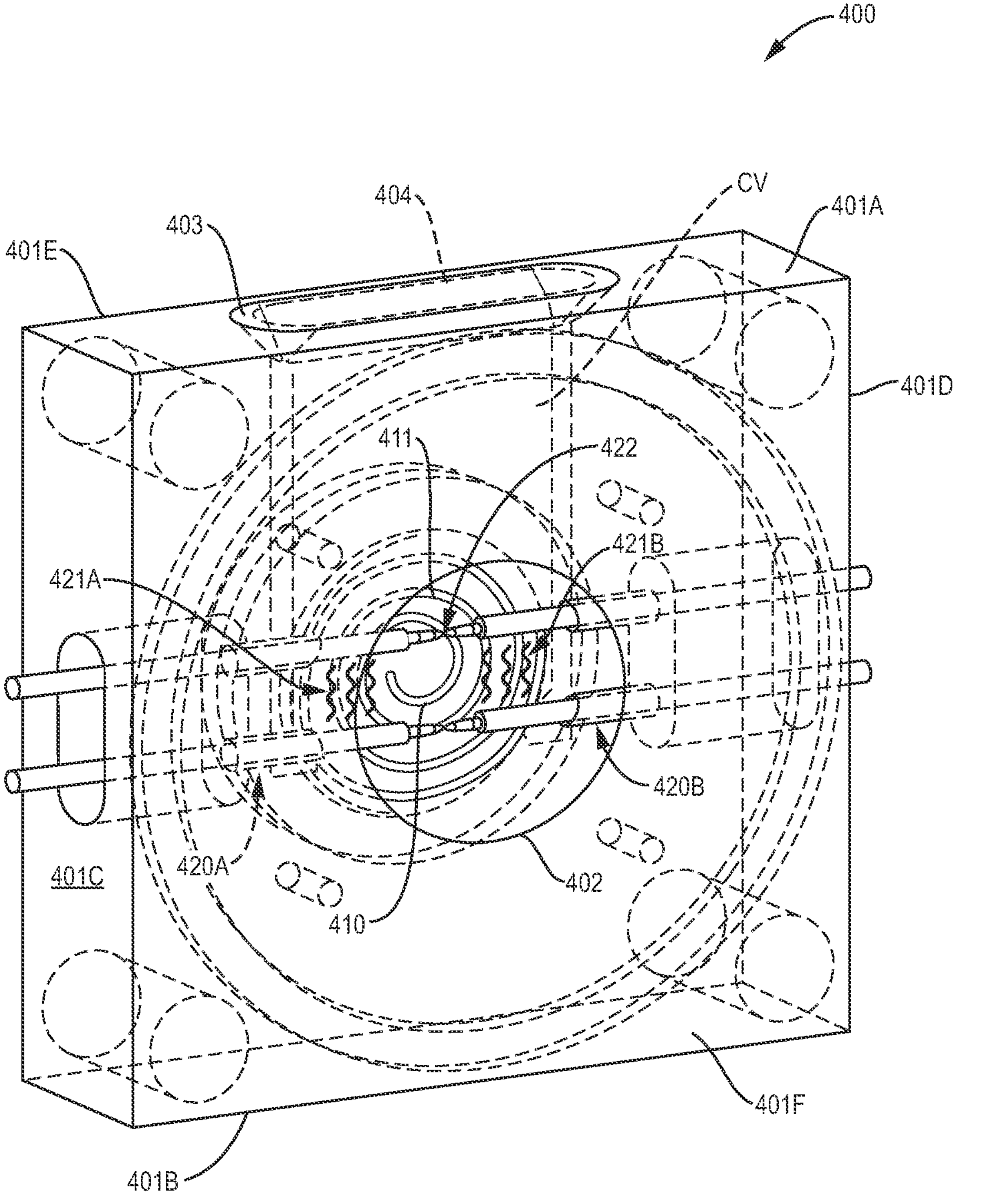
FIG. 4 is a partial cut-away view of an exemplary embodiment of an ionization chamber.
Figure 5:
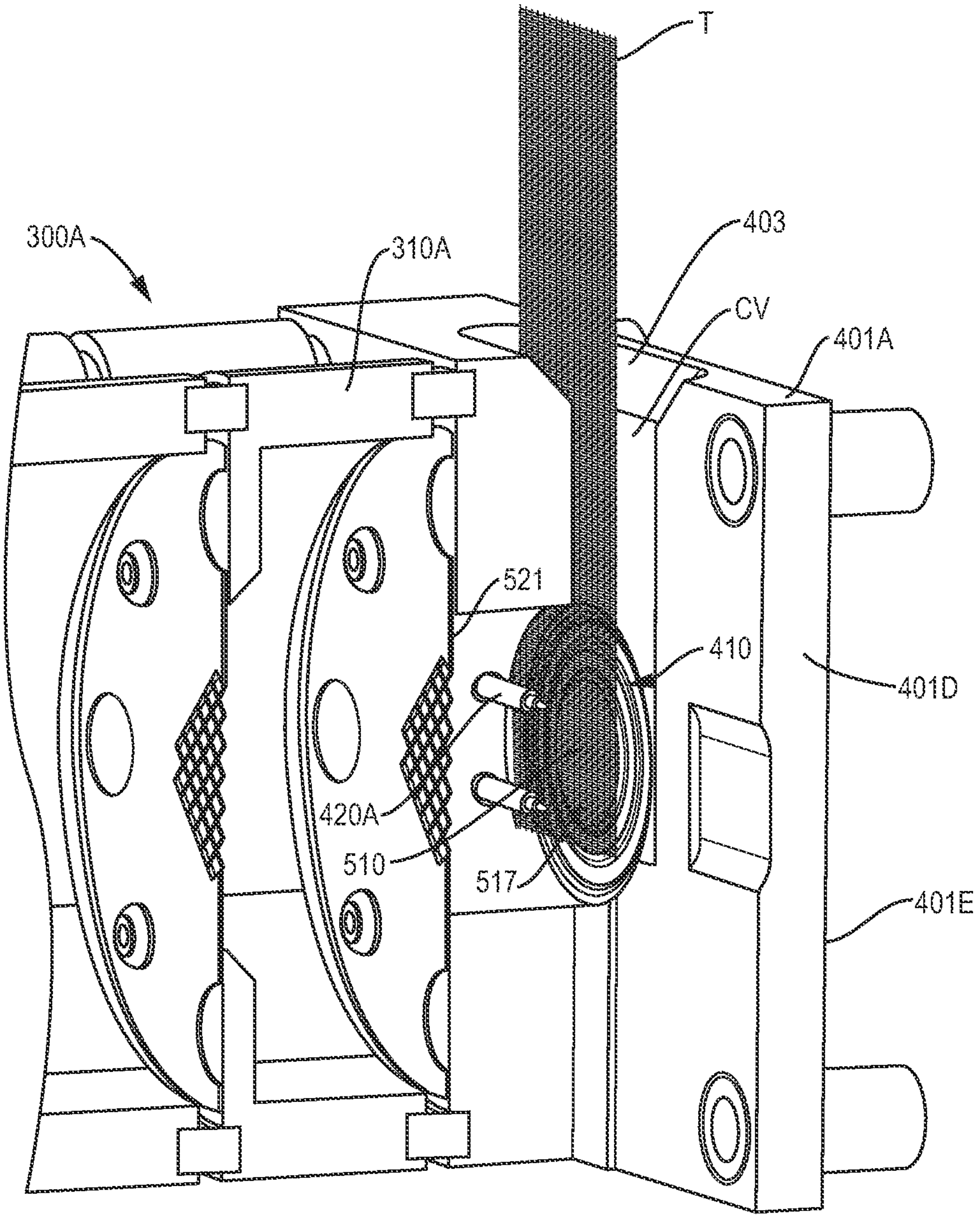
FIG. 5 is a partial cut-away view of the ionization chamber shown in FIG. 4 incorporated in the ion mobility spectrometer shown in FIG. 1B.

In some exemplary embodiments, and referring now to FIGS. 1A and 4-5, a chemical trace detection system 100A includes an IMS 300A in place of the previously described IMS 300, but is otherwise similar to the previously described trace detection system 100 illustrated in FIG. 1A. The IMS 300A is similar to the IMS 300 but includes an ionization chamber 400 disposed within a drift tube 310A. The ionization chamber 400 contains a desorber 410 and one or more ionizers 420A, 420B and, in some embodiments, is removably coupled to the drift tube 310A, as illustrated in FIG. 5. The drift tube 310A is similar to the previously described drift tube 310. The ionization chamber 400 has a plurality of chamber walls 401A, 401B, 4010, 401D, 401E, 401F and defines a chamber volume CV. The desorber 410 is placed in the chamber volume CV and one or more ionizers, shown as two ionizers 420A, 420B, are also placed in the chamber volume CV to form a sample holder 422 between the desorber 410 and the ionizers 420A, 420B for holding a sample 510 (shown in FIG. 5) that is to be analyzed.

In some exemplary embodiments, the sample 510 is introduced into the chamber volume CV through a sample entry 403 formed in one of the chamber walls, such as chamber wall 401A, that extends into the chamber volume CV. In some exemplary embodiments, the desorber 410 has a heater 411 and the ionizers 420A, 420B are non-radioactive spark ionizers, as previously described. The desorber 410 and ionizers 420A, 420B can define a separation distance SD therebetween that is slightly greater than an uncompressed thickness T of the sample 510 so the sample 510 can be held between the desorber 410 and ionizers 420A, 420B without substantially deforming the sample 510. In some exemplary embodiments, the separation distance SD is defined for optimum ionization efficiency. In some exemplary embodiments, the sample 510 is held against the desorber 410, but not the ionizers 420A, 420B, so the material of the desorber 410 heats the sample 510 when activated. The sample 510 may be held against the desorber 410 by gravity or otherwise held by the sample holder 422 to be in contact with the desorber 410.

In some exemplary embodiments, the desorber 410 cannot activate unless an object, such as the sample 510, is detected within the sample holder 422 in order to reduce the risk of radiated heat from the desorber 410 heating and damaging the ionizers 420A, 420B. In some embodiments, the temperature of the sample holder 422 is maintained at, or slightly below, the operating temperature when not in use to reduce the risk of condensation forming and contamination buildup and assist with decontamination. The temperature of the sample holder 422 may be maintained, for example, at no more than 100° C. below the operating temperature when the system 100A is being used regularly. Alternatively, when the system 100A is not being used regularly, the sample holder 422 may be allowed to cool to, for example, ambient temperature in order to save energy.

When the sample holder 422 is placed between the desorber 410 and ionizers 420A, 420B, desorbed particles of the sample 510 are introduced directly into respective ionization regions 421A, 421B generated by the ionizers 420A, 420B as the desorber 410 causes desorption of the particles. As the sample 510 desorbs due to, for example, heat from the desorber 410, the desorbed particles tend to spread away from the sample holder 422 in a vapor plume and end up in the ionization regions 421A, 421B generated by the ionizers 420A, 420B. In some exemplary embodiments, the sample holder 422 is placed at a location where some or all of the sample holder 422 resides within the generated ionization regions 421A, 421B when the ionizers 420A, 420B activate. When the sample holder 422 and held sample 510 are placed in the ionization regions 421A, 421B, desorbed particles from the sample 510 are instantly introduced into the ionization regions 421A, 421B as the particles desorb from the sample 510, which can increase the residence time of the desorbed particles in the ionization regions 421A, 421B and increase the percentage of desorbed particles that are ionized.

In some exemplary embodiments, the ionization chamber 400 is sealed when the sample 510 is placed in the sample holder 422 except for a particle exit 402, which may be formed as a cutout in the front chamber wall 401F. A deformable seal 404 may be associated with the sample entry 403 to seal around the sample 510 when the sample 510 is inserted and also reduce the risk of injury by impeding access to the chamber volume CV from outside the ionization chamber 400. In some exemplary embodiments, the ionization chamber 400 is attached to a drift tube, which may be the previously described drift tube 310, so ionized molecules of the sample 510 that exit the ionization chamber 400 through the particle exit 402 are forced, by the generated electrical field in the drift tube 310, through a particle opening 521 in the drift tube 310 toward the detector 330. In some exemplary embodiments, the ionization chamber 400 is located entirely within the drift tube 310 and one or more of the chamber walls 401A, 401B, 401C, 401D, 401E, 401F are formed as a part of the drift tube 310. For convenient cleaning, some or all of the ionization chamber 400, as well as the desorber 410 and ionizers 420A, 420B, may be readily separable from the drift tube 310 and dissembled without damaging the components. In some exemplary embodiments, the desorber 410 and ionizers 420A, 420B are readily separable from the ionization chamber 400. It should therefore be appreciated that the ionization chamber 400, desorber 410, and ionizers 420A, 420B are, in some embodiments, components of a modular ionization assembly that can be conveniently removed from the IMS 300 for cleaning, repair, replacement, etc.

Referring now to FIGS. 6A-8B, an exemplary embodiment of a removable desorber 600 for use in the IMS 300 is shown. The desorber 600 includes a desorber body 610, a sample holder 620 connected to the desorber body 610, a sample trap 630 held in the sample holder 620, and a sample heater 640 carried by the desorber body 610 to desorb a sample contained by the sample trap 630.

Figure 8A:
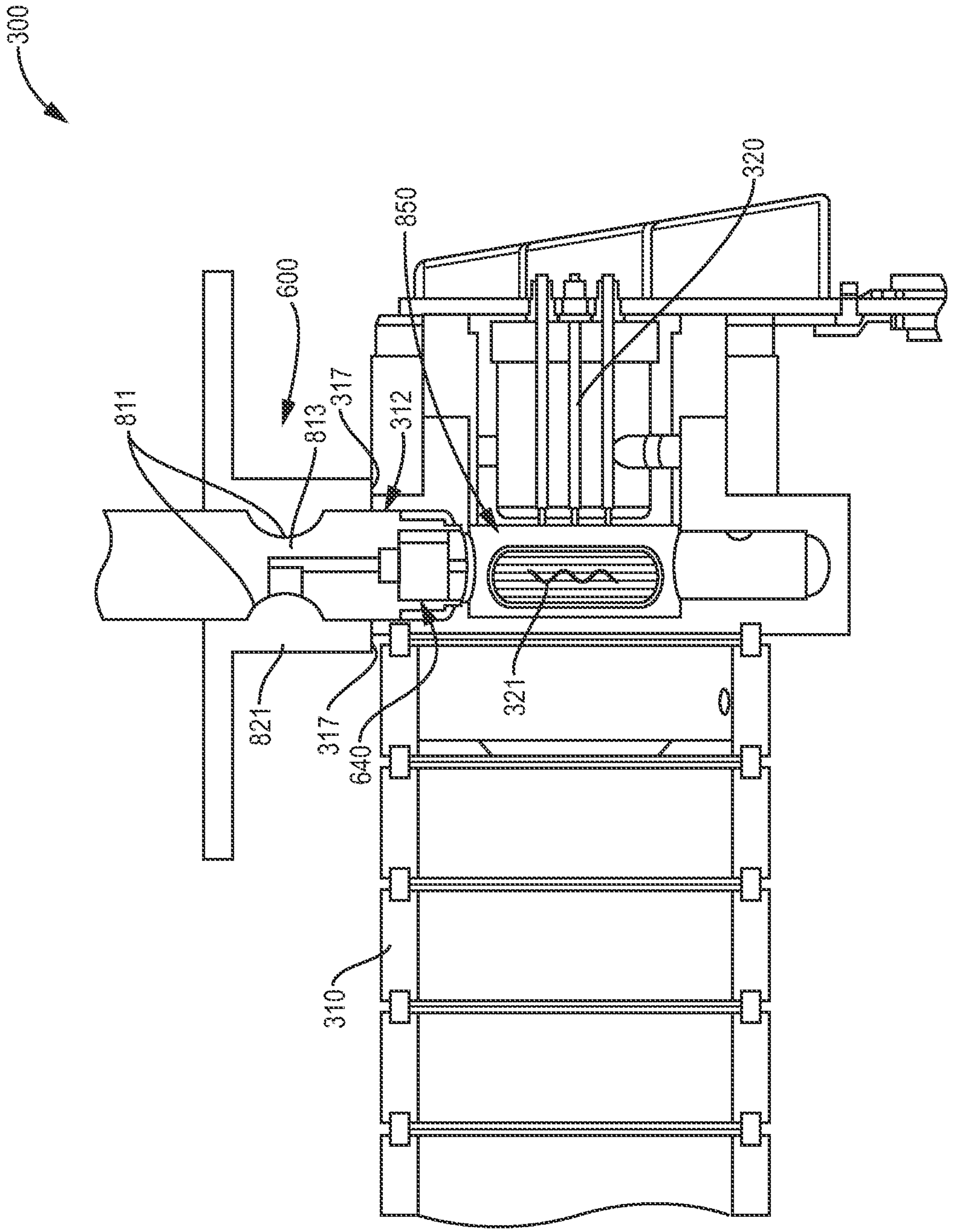
FIG. 8A is a cross-sectional view of the removable desorber shown in FIGS. 6A and 7 coupled with a drift tube.
Figure 8B:
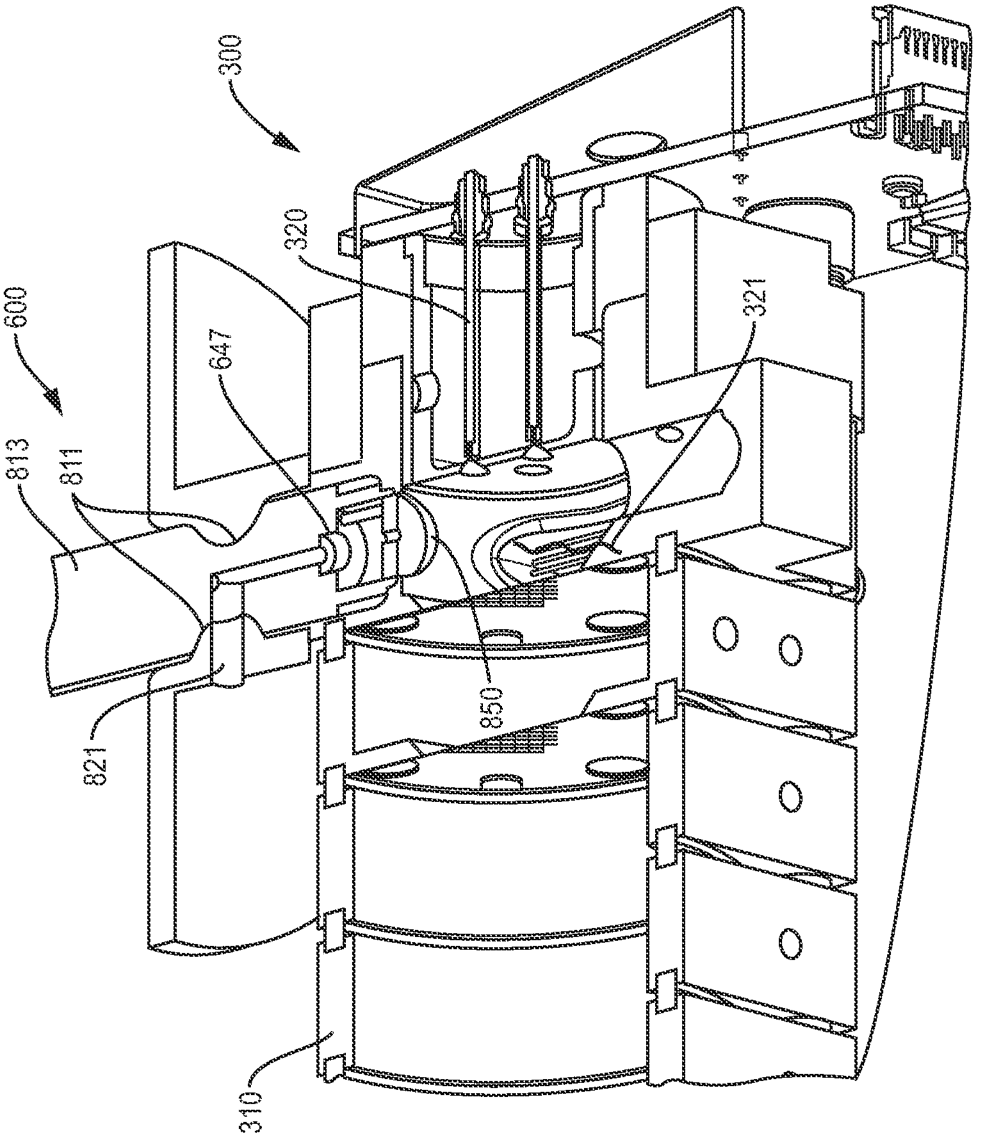
FIG. 8B is another cross-sectional view of the removable desorber and drift tube illustrated in FIG. 8A.

The desorber body 610 may be generally cylindrical between a first end 610A and a second end 610B and have a cross-sectional dimension D of, for example, 15 mm to 25 mm, and an overall length L of, for example, 300 mm to 400 mm. While the desorber body 610 is illustrated as being generally cylindrical, the desorber body 610 may be one or more different shapes, including but not limited to oblong, rectangular, oval, etc. In some exemplary embodiments, a gripping region 611 located between the first end 610A and second end 610B of the desorber body 610 comprises a polymer, ceramic, or other type of thermal insulating material for a user to safely handle after use. The gripping region 611 may, in some embodiments, include non-slip features such as ridges, dimples, etc. for a user to grip while handling the desorber 600. The desorber body 610 may be partially hollow, as can be seen in FIGS. 8A and 8B, and have two or more channel openings 612A, 612B formed through an exterior surface 613 of the desorber body 610 to a fluid flow channel 813 (shown in FIGS. 8A and 8B) formed in the desorber body 610. Forming the two or more channels openings 612A, 612E to the fluid flow channel 813 in the desorber body 610 allows relatively cool fluid flow, such as ambient air, through the fluid flow channel 813 via the openings 612A, 612B to dissipate heat from the desorber 600 or, alternatively, heat various components of the desorber 600 with heated fluid, such as heated air, flowing through the fluid flow channel 813 via the channel openings 612A, 612B. In some exemplary embodiments, the sampler holder 620 is located at the second end 610B of the desorber body 610 and one of the channel openings 612A is firmed closer to the first end 610A of the desorber body 610 than the second end 610B while the other channel opening 612B is formed adjacent to the second end MOB, where the sample holder 620 is located. In some exemplary embodiments, one of the openings is turned in the sample holder 620 so fluid introduced into the fluid flow channel 813 from the other opening(s) flows through the fluid flow channel 813 to the sample holder 620, and the sample trap 630, and, in some embodiments, the sample heater 640. In some exemplary embodiments, the fluid flow channel 813 defines a channel length that is between 20% to 40% of the overall length L of the desorber body 610.

The sample holder 620 is connected to the desorber body 610 to hold the sample trap 630. In some exemplary embodiments, the sample holder 620 and sample trap 630 are located at the second end 610B of the desorber body 610 so the sample trap 630 can capture a sample, such as residue, when the second end 610B of the desorber body 610 is rubbed across a surface, such as an exterior surface of a piece of luggage. The sample holder 620 may be formed with a locking mechanism (not shown) to releasably grasp a corresponding locking portion (not shown) of the sample trap 630 and allow convenient release of the sample trap 630 from the sample holder 620. In some exemplary embodiments, the sample holder 620 may be integrally formed in the desorber body 610 with, for example, a cup-shape for holding the sample trap 630. While the sample holder 620 may be formed to have a wide variety of surfaces for holding differently sized sample traps 630, some exemplary shapes for the sample holder 620 are flat, oval, and spherical. To promote heating of the sample trap 630, the sample holder 620 may comprise one or more thermally conductive materials, such as metals. Exemplary metals that may be used to form the sample holder 620 include, but are not limited to, copper, silver, platinum, gold, nichrome, nickel, steel, and aluminum. In some exemplary embodiments, the sample holder 620 comprises one or more thermally insulating materials, such as ceramics. Exemplary ceramics that may be used to form the sample holder 620 include, but are not limited to, various types of glasses and alumina-based ceramics. In some embodiments, the sample holder 620 comprises one or more high temperature polymers such as polyether ketones (PEK), polyether ether ketones (PEEK), polyimide (PT), polyamide-imides (PAT), polybenzimidazoles (PBI), polyethylerimides (PET), polysulfones (PSU), poly(phenylene sulfides) (PPS), or blends thereof, which may be stabilized by cross-linking.

The sample trap 630 is held in the sample holder 620 to capture and contain a sample for analysis by the IMS 300. The sample trap 630 may comprise similar materials to the previously described sample trap 356. In some exemplary embodiments, a capture portion 731 (shown in FIG. 7) of the sample trap 630 may extend past the second end 610B of the desorber body 610 for capturing samples as the sample trap 630 rubs across a surface. As previously described, the sample trap 630 may be formed with a locking portion to releasably lock the sample trap 630 to the sample holder 620. In some exemplary embodiments, the sample holder 620 and the sample trap 630 are integral with one another and releasably connected to the desorber body 610.

The sample heater 640 is carried by the desorber body 610 to thermally desorb a sample contained by the sample trap 630. In some exemplary embodiments, the sample heater 640 is a resistive heater comprising a resistive material that generates heat when current flows through the material. In some exemplary embodiments, some or all of the sample heater 640 contacts the sample holder 620 to conductively heat the sample holder 620. For example, the resistive material of the sample heater 640 may be located at, or adjacent to, the second end 610B of the desorber body 610 when the sample holder 620 is located at the second end 610B of the desorber body 610 to conductively heat the sample holder 620 when current flows through the resistive material. In some exemplary embodiments, the resistive material of the sample heater 640 is embedded within or wraps around the sample holder 620. Alternatively, a heat bridge (not shown) may be placed in contact with both the sample holder 620 and the sample heater 640 to transmit heat from the sample heater 640 to the sample holder 620. In some exemplary embodiments, the sample heater 640 may be spaced-apart from the sample holder 620 to non-conductively heat the sample holder 620. One exemplary sample heater 640 that may be included to non-conductively heat the sample holder 620 is a variable frequency pulsed photon source carried by the desorber body 610 and directed at the sample holder 620, but it should be appreciated that other types of non-conductive sample heaters may be incorporated in the desorber 600.

Figure 6A:
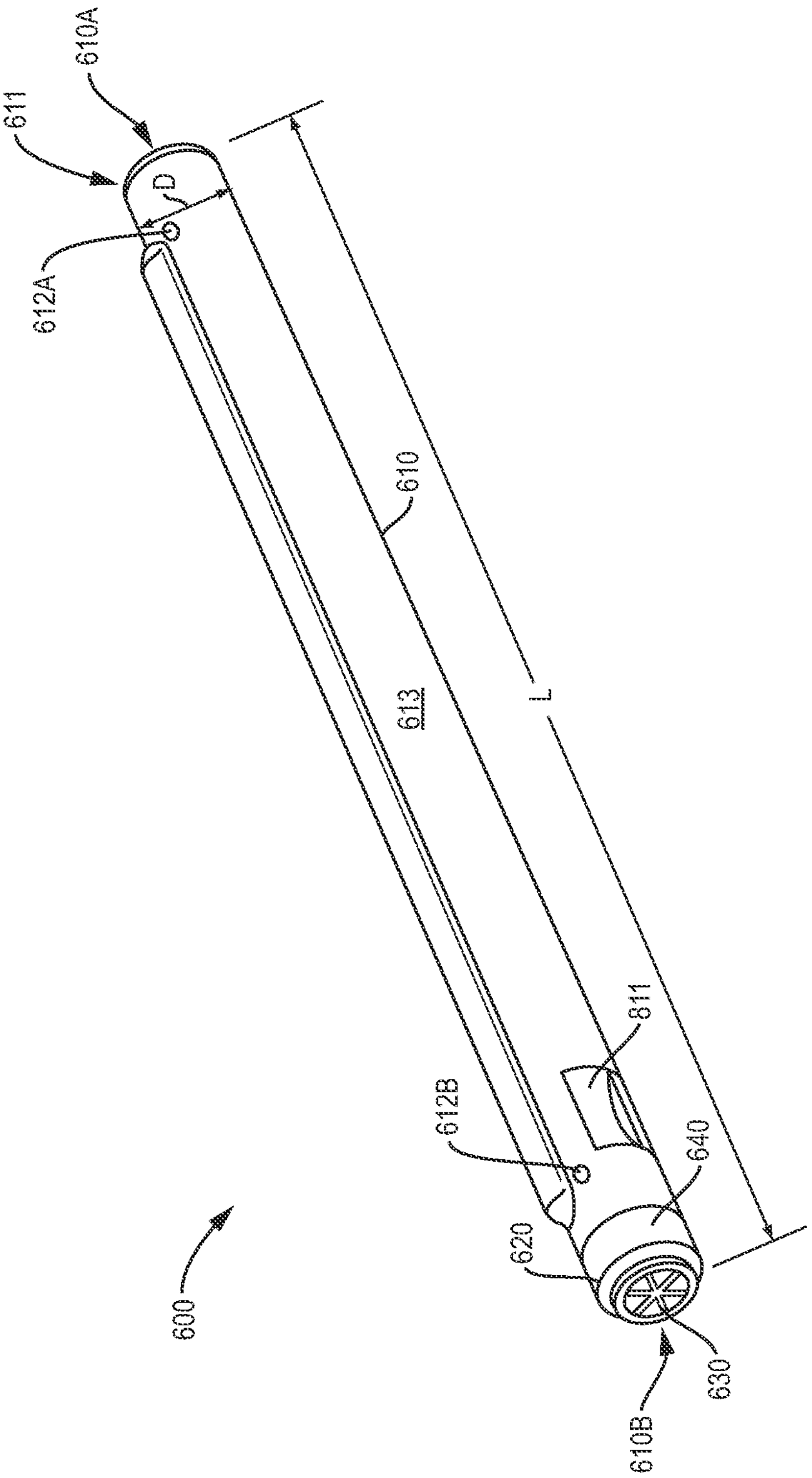
FIG. 6A is a perspective view of an exemplary embodiment of a removable desorber.
Figure 6B:
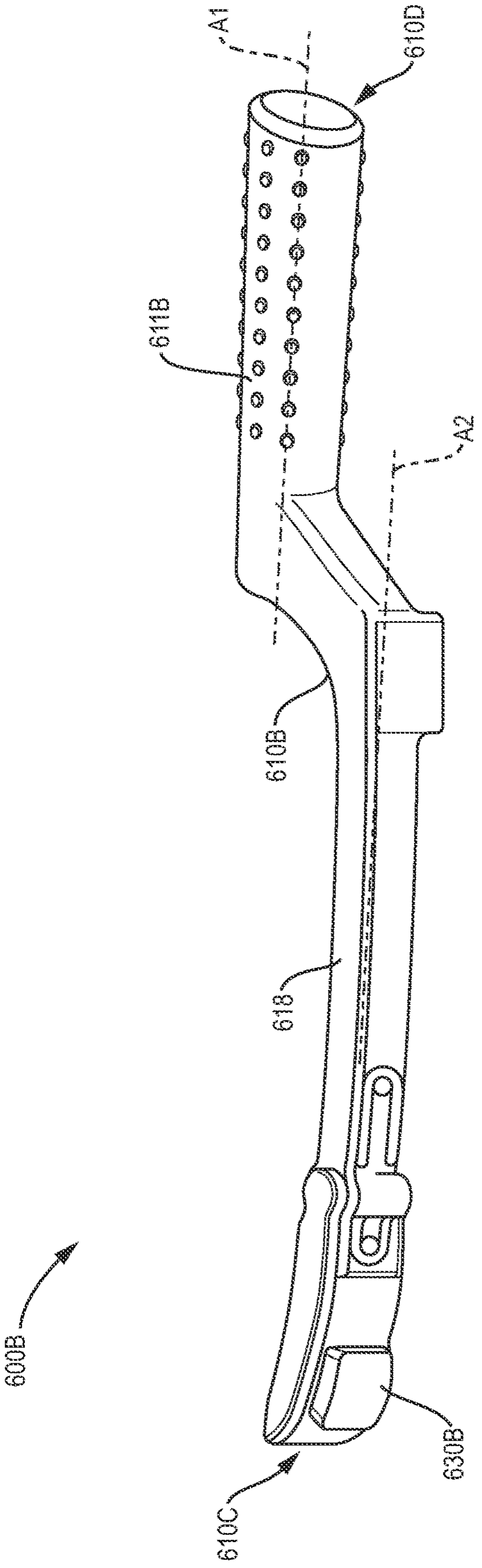
FIG. 6B is a perspective view of another exemplary embodiment of a removable desorber with an alternative body shape.
Figure 7:
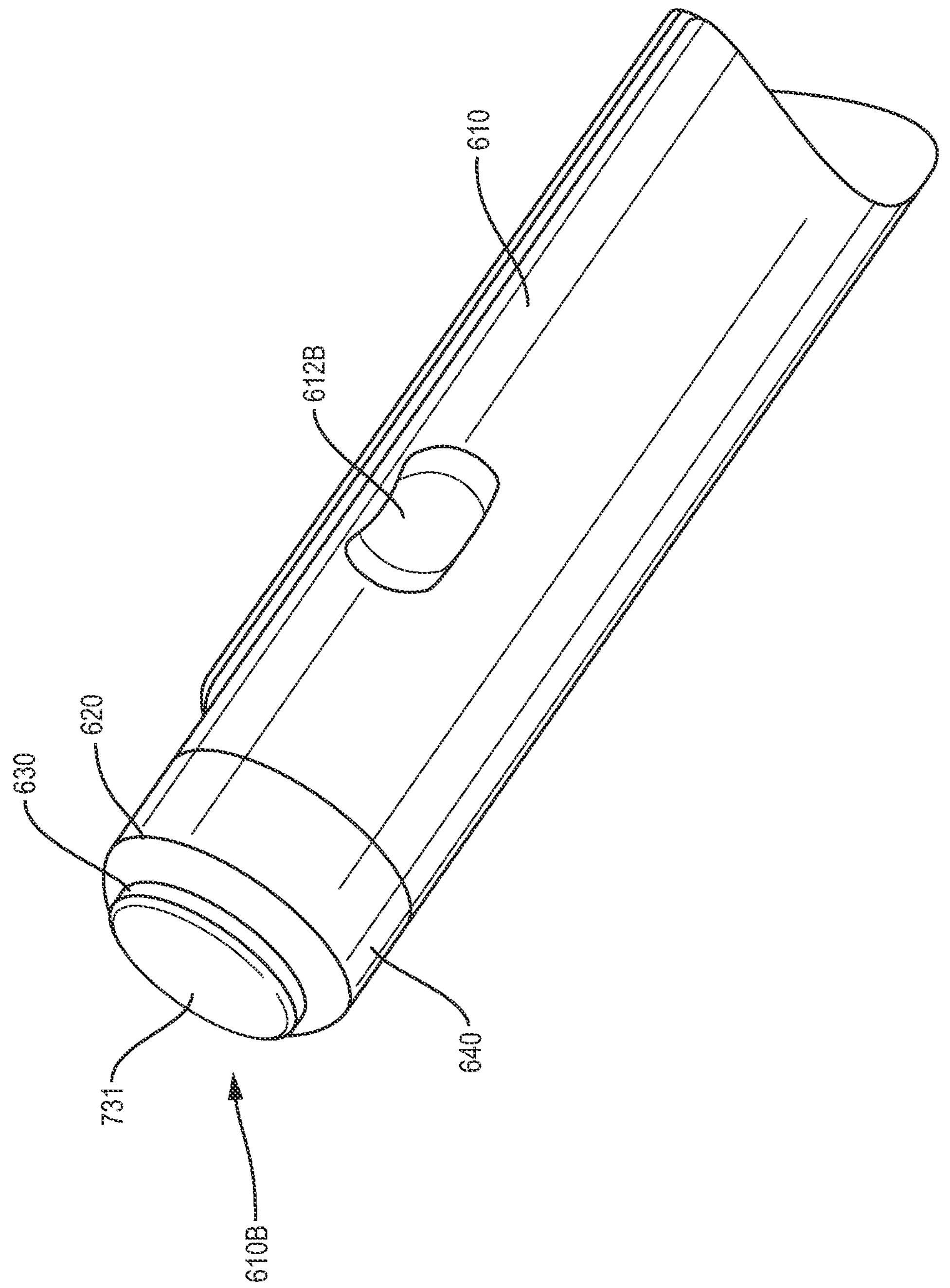
FIG. 7 is a perspective view of the removable desorber shown in FIG. 6A.

Referring now to FIG. 6B, another exemplary embodiment of a desorber 600B is illustrated that includes a desorber body 610B that is generally cylindrical, rectangular, or trapezoidal in shape. As illustrated, the desorber body 610B may be in the shape of a "wand" and include a gripping region 611B defining a first axis A1 and a sampling portion 618 defining a second axis A2 that is offset from the first axis A1. In some embodiments, the sampling portion 618 has a curved shape and holds a sample trap 630B at an end 610C opposite an end 610D with the gripping region 611B. In all other respects, the desorber 600B may be similar to the previously described desorber 600.

Referring now to FIGS. 8A and 8B, the desorber 600 is shown coupled to the drift tube 310 in order to directly introduce desorbed sample particles from the sample trap 630 into the ionization region 321 for analysis. In some exemplary embodiments, the desorber 600 is coupled to the drift tube 310 by coupling desorber attachment features 855 formed on or in the desorber body 610 with the tube attachment feature 317 of the sample inlet 312 when the desorber 600 is in a locking position relative to the sample inlet 312. The sample heater 640 of the desorber 600 may have a pair of desorber contacts 811 extending to the exterior surface 613 of the desorber 600 that make electrical contact with drift tribe contacts 821 of the drift tube 310 to electrically couple the sample heater 640 to a current source when the desorber 600 is coupled to the drift tube 310. The current source may be, for example, the previously described voltage source 340. When the desorber contacts 811 make electrical contact with the drift tube contacts 821, the sample heater 640 can draw current to heat the sample holder 620, and the sample trap 630 held in the sample holder 620, to desorb the sample contained in the sample trap 630. The desorbed sample particles vaporize directly into the ionization region 321 for ionization and subsequent analysis.

In some exemplary embodiments, the TMS 300 includes a macro filter 850. The macro filter 850 may be placed, for example, between the ionization region 321 and the sample inlet 312 to prevent macro-sized particles from entering the ionization region 321. In some exemplary embodiments, the macro filter 850 is an electroplated steel mesh filter mounted on a thin polymer holder 851 and has pores or other types of openings with a maximum opening size of between 2 μm and 400 μm, such as between 8 and 12 μm. The macro filter 850 may be mounted in the MIS 300 in a manner that allows convenient removal of the macro filter 850 from the IMS 300 by, for example, sliding the macro filter 850 out of the IMS 300 for cleaning or replacement.

In some exemplary embodiments, the IMS 300 may have a separate heating element for heating the macro filter 850 to bake accumulated contaminants off of the macro filter 850. After analysis, the desorber 600 may be removed from the IMS 300 by completely uncoupling the desorber attachment feature 855 from the tube attachment feature 317. In some exemplary embodiments, the desorber 600 may have an intermediate coupling position in which the sample holder 620 is not placed adjacent to or in the ionization region 321, but is not fully removed from the drift tube 310, by, for example, only partially pulling the desorber 600 away from the drift tube 310. When the desorber 600 is in the intermediate coupling position, a cooling gas stream, such as pressurized air, may be forced across the sample holder 620 through a cooling opening formed in the drift tube 310 to cool the sample holder 620 and its contents prior to complete removal from the drift tube 310. In some exemplary embodiments, the cooling gas stream may be automatically forced across the sample holder 620 when the desorber 600 is in the intermediate coupling position. The cooling gas stream may be forced across the exterior of the sample holder 620 and, or alternatively, forced into the fluid flow channel 813 of the desorber body 610 to cool the sample holder 620. In some exemplary embodiments, the cooling gas stream may be provided by, or in addition to, a purging gas flow through the drift tube 310 to prepare the IMS 300 for the next cycle of sample desorption and analysis.

Figure 9:
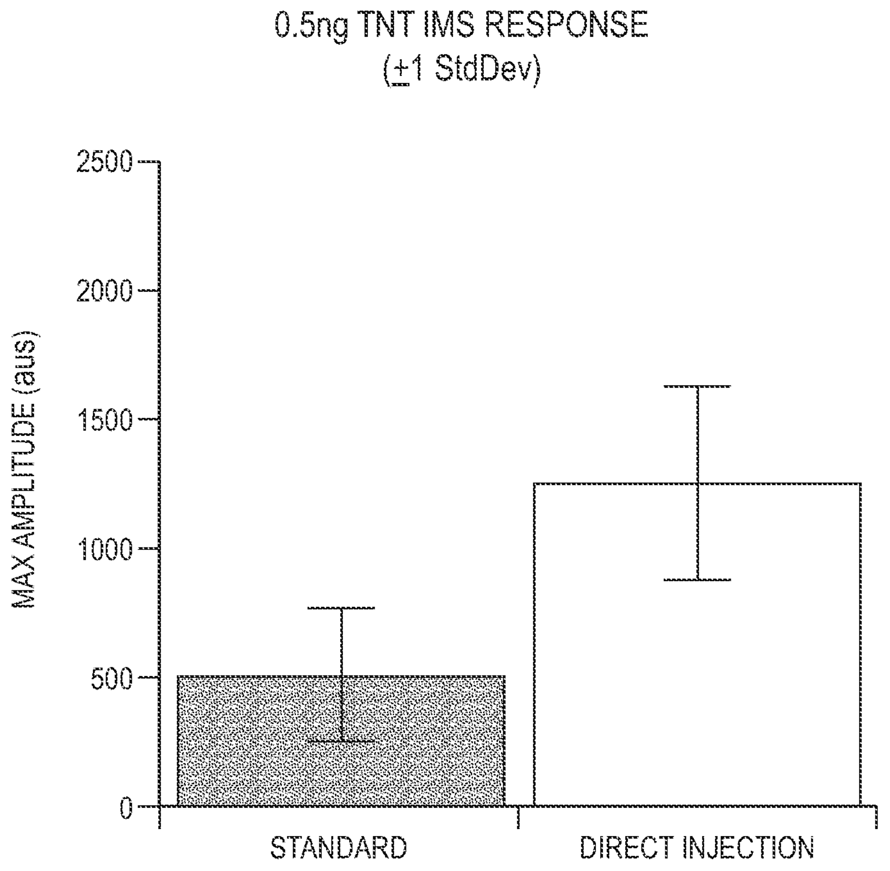
FIG. 9 is a table illustrating test data results for detecting trinitrotoluene in the prior art ion mobility spectrometer of FIG. 2 using a "standard" approach compared to a direct injection approach.

To determine the merits of directly introducing desorbed sample particles into the ionization region with, for example, the desorber 600 and referring now to FIG. 9, various tests were performed comparing analysis of 2 μL of trinitrotoluene (TNT) solution containing 0.5 ng TNT deposited on a BYTAC® strip using a known IMS, such as the IMS 200 shown in FIG. 2. The tests were performed using either a "standard" approach in which the desorbed particle samples traveled through the transfer line 251 to the ionization region 221 or a direct injection approach in which the desorbed particles were introduced directly into the ionization region 221 with, for example, the desorber 600. For the standard approach, the IMS 200 was used in an unmodified form according to standard procedures, which are previously described in the context of FIG. 2. For the direct injection approach, the transfer line 251 was removed and the TNT solution was drawn into a needle attached to a syringe. The tip of the needle was placed in the ionization region 221 and a plunger of the syringe was depressed to force the desorbed TNT particles directly into the ionization region 221 and simulate direct injection. The only difference between the standard approach and direct injection approach was the way in which the desorbed. TNT particles were introduced into the ionization region 221. As can be seen from FIG. 9, the direct injection approach produced a significantly higher (more than double) average maximum amplitude signal for TNT than the standard approach.

Based on the collected data shown in FIG. 9, it was determined that the direct injection approach provides a viable approach to significantly increase the sensitivity of an IMS system to various compounds, such as TNT, compared to standard approaches, allowing for accurate detection of smaller sample sizes. It is predicted that the direct injection approach can provide between 2 and 4 magnitudes of net gain, compared to standard approaches, based on the sample dilution and losses in conventional systems used for standard approaches to detect substances in samples. The predicted net gain assumes a 1 ng sample, which is an average limit of detection (LOD) for cyclotrimethylenetrinitramine (RDX) explosive, containing 3 trillion molecules.

In the conventional IMS 200, a volume flow in the range of 100-1000 standard cubic centimeter per minute (sccm) is required to transport the desorbed sample to the ionization region 221, diluting the sample by a similar amount. A conservative air flow of 100 sccm, for example, produces an RDX concentration in the flowing air of 1 ppb. Compared to a direct injection approach where the RDX is introduced directly into an ionization region having a volume of 1 cubic centimeter, the concentration is increased by at least two orders of magnitude (or 0.1 parts per million) so the smallest detectable amount is 10 pg. The direct injection approach, therefore, is predicted to achieve at least three orders of magnitude net gain, compared to the standard approach, by combining removal of the sample dilution associated with air flow transport of the desorbed sample particles with the lack of transfer line surfaces that adsorb desorbed sample particles and longer residence time of the desorbed particles in the ionization region 321.

Figure 10:
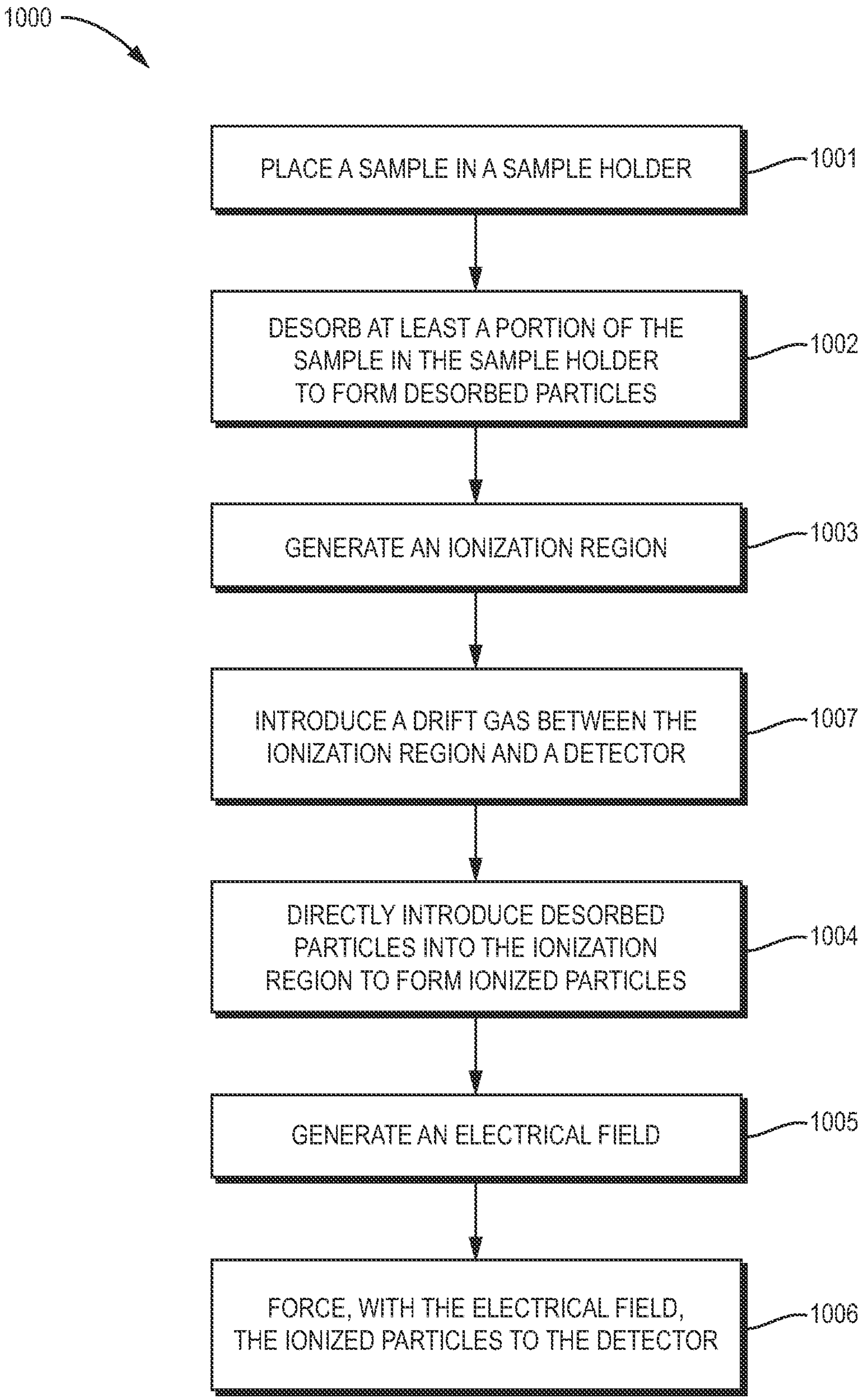
FIG. 10 is a flow chart illustrating an exemplary embodiment of a method for detecting one or more substances with a chemical trace detection system.

Referring now to FIG. 10, a flow chart illustrating an exemplary embodiment of a method 1000 for detecting one or more substances with the chemical trace detection system 100 is provided. In some embodiments, the method 1000 includes steps 1001, 1002, 1003, 1004, 1005, 1006, and 1007, which are described further herein. Step 1001 includes placing a sample in a sample holder, such as previously described sample holders 351, 422, 620, and step 1002 includes desorbing at least a portion of the sample in the sample holder 351, 422, 620 to form desorbed particles. In some exemplary embodiments, the sample is placed in the sample holder 351, 422, 620 by rubbing a sample trap 356, 630 held in the sample holder 351, 422, 620 across a surface to capture the sample in the sample trap 356, 630. Desorbing the sample may comprise thermal desorption, chemical desorption, or any other suitable way of producing desorbed sample particles. Step 1003 includes generating an ionization region 321, which may occur before, during, or after desorbing the sample 1002. Step 1004 includes directly introducing the desorbed sample particles into the generated ionization region 321 from the sample holder 351, 422, 620 to form ionized molecules for analysis. Before, during, or after step 1004, step 1005 can be performed and includes generating an electrical field. Step 1006 includes forcing, with the electrical field generated by step 1005, the ionized molecules to a detector 330, which may be disposed in the drift tube 310 and analyzes the contents of the sample based on the various drift times of molecules in the sample. In some exemplary embodiments, step 1007 includes introducing a drift gas, such as dry ambient air, between the ionization region 321 and the detector 330.

To accurately quantify and detect chemicals or compounds, the IMS 300 utilizes drift gas. If the drift gas supplied to the IMS is ambient air, it is important that the air is de-humidified to a relative humidity of less than 2% prior to being introduced into the drift tube 310 of the IMS 300. If there is too much moisture in the air entering the drift tube 310, the water molecules in the air can associate with, dissolve, or otherwise interact with the ionized molecules and affect the mobility characteristics of the ionized molecules traveling toward the detector 330, potentially causing false-positive or false-negative detection. Thus, it is imperative to ensure the relative humidity of ambient air entering the drift tube 310 to act as a drift gas is sufficiently low.

In some exemplary embodiments, and referring now to FIG. 11, a chemical trace detection system 1100 includes an ion mobility spectrometer, such as previously described IMS 300, supplied with drift gas from a regenerable dryer assembly 1200 fluidly coupled with the IMS 300. It should be appreciated that, while the regenerable dryer assembly 1200 is shown supplying drift gas to the IMS 300, the regenerable dryer assembly 1200 may also supply dry drift gas to a conventional or other type of IMS, such as IMS 200. In some exemplary embodiments, both the IMS 300 and the regenerable dryer assembly 1200 are controlled by a common system controller 1110 that is operatively coupled to an input device 1120 such as, for example, a touch screen device to allow a user to control operation of the chemical trace detection system 1100. In some exemplary embodiments, the IMS 300 and the dryer assembly 1200 each have a respective controller to control respective functions.

To supply the IMS 300 with dry drift gas, and referring now to FIG. 12, an exemplary embodiment of a dryer assembly 1200 includes a pump 1210, a desiccant chamber 1220 fluidly coupled to the pump 1210, a heater 1230, and a valve 1240 fluidly coupled to the desiccant chamber 1220 and the IMS 300. The pump 1210 may include a filter 1210 and be fluidly coupled to the desiccant chamber 1220 by a pump conduit 1221. The desiccant chamber 1220 holds a regenerable dessicant material 1222 and may, in some embodiments, have a humidity sensor 1223 and spring 1224 placed therein. A heater 1230 and, in some embodiments, a cooler 1231 may be associated with the desiccant chamber 1220. In some embodiments, a purging fan 1232 may be located downstream of the desiccant chamber 1220 and fluidly coupled to a chamber conduit 1241 fluidly coupling the desiccant chamber 1220 to the valve 1240, which may be referred to as a "first valve." The valve 1240 may be fluidly coupleable to the IMS 300 by a conduit 1242 and to the environment by a vent conduit 1243, depending on a state of the valve 1240 as will be described further herein.

As shown in FIG. 12, the pump 1210 forces ambient air through the dryer assembly 1200 from the environment to generate a dry drift gas. In some exemplary embodiments, the pump 410 pumps gas from a closed container, such as a pressurized cylinder. In some exemplary embodiments, the pump 410 produces a positive pressure to blow gas through the regenerable dryer assembly 1200. In some exemplary embodiments, the pump 1210 produces a negative pressure to draw gas through the regenerable dryer assembly 1200 and is located, for example, downstream of the desiccant chamber 1220, rather than upstream of the desiccant chamber 1220 as shown in FIG. 12. A filter 1211, such as a high-efficiency particulate air (HEM) filter, or similar element may be placed upstream, or as a part of, the pump 1210 to remove contaminants from air entering the pump 1210 and reduce the likelihood of such contaminants affecting operation of the IMS 300. In some exemplary embodiments, the pump 1210 is operatively coupled to the system controller 1110, which can selectively control operation of the pump 1210 as described further herein.

The desiccant chamber 1220 is fluidly coupled to the pump 1210 by, for example, a pump conduit 1221 and holds a regenerable desiccant material 1222 to reduce a relative humidity of gas flowing through the desiccant chamber 1221) and generate dry drift gas. As used herein, the desiccant material 1222 is "regenerable" in the sense that the desiccant material 1222 can be heated to a regeneration temperature in order to release adsorbed liquid, such as water, from the desiccant material 1222 as vapor to reduce the liquid saturation of the desiccant material 1222. The released vapor can be removed from the desiccant chamber 1220 by airflow from the pump 1210 or otherwise. In some exemplary embodiments, dry drift gas leaving the desiccant chamber 1220 has a relative humidity of less than 5%, such as less than 2%, less than 1%, or less than 0.5%. In some exemplary embodiments, the regenerable desiccant material 1222 is packed into the desiccant chamber 1220, which may have a cylindrical shape, such that substantially all of the surface area of the desiccant chamber 1220 is covered by the regenerable desiccant material 1222. To assist in keeping the regenerable desiccant material 1222 packed in the desiccant chamber 1220, a spring 1224 or similar element may be disposed in the desiccant chamber 1220 to bear on the packed regenerable desiccant material 1222. In some exemplary embodiments, the regenerable desiccant material 1222 includes, but is not limited to, one or more of: a molecular sieve, silica, activated charcoal, calcium sulfate, and calcium chloride.

The heater 1230, as shown in FIG. 12, contacts the desiccant chamber 1220 in order to heat the regenerable desiccant material 1222 and evaporate liquid, such as water, from the desiccant material 1222. The heater 1230 may, in some exemplary embodiments, be a resistive heater including one or more coils of resistive material that produce heat when electrical current flows through the coil(s). The coil(s) may, for example, be embedded or wound around the desiccant chamber 1220 to heat the regenerable desiccant material 1222 held in the desiccant chamber 1220. While the heater 1230 is described as a resistive heater that generates heat from electrical current flowing through the heater 1230, it should be appreciated that the heater 1230 can generate heat in other ways such as, for example, chemical reactions or induction heating. The heater 1230 may be configured to heat the regenerable desiccant material 1222 to a variety of different regeneration temperatures greater than the boiling temperature of water (100° C.), such as between 200° C. and 250° C. The regeneration temperature may be selected based on, for example, the composition of the regenerable desiccant material 1222, the liquid saturation of the regenerable desiccant material 1222, and the desired relative humidity level of the dry drift gas.

In some exemplary embodiments, the heater 1230 is part of a temperature control assembly that also includes a cooler 1231 to cool the regenerable desiccant material 1222. The cooler 1231 may include a fan or other type of element for flowing relatively cool fluid, such as air or water, over and/or through the desiccant chamber 1220 to absorb heat and cool the regenerable desiccant material 1222. In some exemplary embodiments, the cooler 1231 is configured to cool the regenerable desiccant material 1222 to an operating temperature of between 20° C. and 55° C., the significance of which will be described further herein. In some exemplary embodiments, the heater 1230 and the cooler 1231 are both operatively coupled to the system controller 1110, which can control operation of the heater 1230 and the cooler 1231.

To control the flow of gases through the regenerable dryer assembly 1200, the valve 1240 between the desiccant chamber 1220 and the IMS 300 is switchable between an operating state and a regenerating state. In the operating state, the valve 1240 fluidly couples the desiccant chamber 1220 to, for example, the drift gas inlet 311 of the drift tube 310 of the IMS 300 so the desiccant chamber 1220 can supply dry drift gas to the drift tube 310 of the IMS 300. While supplied with dry drift gas, the IMS 300 can operate normally to detect one or more substances of interest from a sample. When the valve 1240 switches to the regenerating state, the valve 1240 fluidly uncouples the desiccant chamber 1220 from the IMS 300 to prevent supplying dry drift gas to the IMS 300 from the desiccant chamber 1220 so the IMS 300 does not receive dry drift gas. In some exemplary embodiments, the valve 1240 is a three-way valve. The valve 1240 may be fluidly coupled to the desiccant chamber 1220 by a chamber conduit 1241, fluidly coupled to the IMS 300 by a conduit 1242, and fluidly coupled to the environment by a vent conduit 1243. In some exemplary embodiments, the valve 1240 may include one or more water-absorbent materials, such as a sponge, to soak up condensation that forms on or in the valve 1240 during operation. In some exemplary embodiments, the valve 1240 is an electrically controlled valve including one or more solenoids to switch between the various valve states and is operatively coupled to the system controller 1110, which can selectively signal the valve 1240 to switch between the operating state and the regenerating state.

The IMS 300 can utilize dry drift gas from the desiccant chamber 1220 to detect one or more substances of interest in a sample, as previously described. In some exemplary embodiments, the desiccant chamber 1220 is the sole source of dry drift gas for the IMS 300 so any dry drill gas flowing through the IMS 300 necessarily flows through the desiccant chamber 1220 first. In some exemplary embodiments, the IMS 300 operates when gas flows through the desiccant chamber 1220 to produce dry drift gas, which then flows to the IMS 300.

The chemical trace detection system 1100 can follow an operation protocol to detect one or more substances of interest. In some exemplary embodiments, the system controller 1110 is configured to switch the chemical trace detection system 1100 between the operation protocol to detect one or more substances of interest and a regeneration protocol to regenerate the desiccant material 1222, which is described further herein. During the operation protocol, the valve 1240 is in the operating state and the pump 1210 supplies gas to the desiccant chamber 1220 to generate dry drift gas. Dry drift gas from the desiccant chamber 1220 can then flow through the valve 1240 into the drift tube 310 of the IMS 300, where the IMS 300 utilizes the dry drift gas to detect one or more substances of interest. In some exemplary embodiments, the operation protocol is continuous so the regenerable dryer assembly 1200 constantly supplies dry drift gas to the MTS 300 until the system controller 1110 switches the chemical trace detection system 1100 out of the operation protocol.

As the chemical trace detection system 1100 operates, the regenerable desiccant material 1222 in the desiccant chamber 1220 becomes saturated with water that is removed from gas flowing through the desiccant chamber 1220. After the water saturation of the regenerable desiccant material 1222 reaches a certain level, depending on the desiccant material, the regenerable desiccant material 1222 may no longer efficiently remove sufficient amounts of water to produce dry drift gas and the IMS 300 may not accurately detect substances of interest. In some embodiments, the system controller 1110 is configured to start the regeneration protocol when a desiccant moisture of the regenerable desiccant material 1222 reaches a saturation level where minimal, if any, further moisture is adsorbed by the regenerable desiccant material 1222.

To determine the water saturation of the regenerable desiccant material 1222, a humidity sensor 1223 can be placed inside or downstream from the desiccant chamber 1220 adjacent the chamber conduit 1241 and operatively coupled to the system controller 1110 to detect the relative humidity of gas flowing out of the desiccant chamber 1220. In some exemplary embodiments, the system controller 1110 is configured to detect the relative humidity of gas flowing out of the desiccant chamber 1220 and determine if the relative humidity is greater than one or more thresholds. In some exemplary embodiments, the system controller 1110 may output a high humidity alert signal to the touch screen input device 1120 when the relative humidity of gas flowing out of the desiccant chamber 1220 reaches a first threshold in order to warn an operator that the regenerable desiccant material 1222 should be regenerated soon. The system controller 1110 may also automatically switch the chemical trace detection system 1100 out of the operation protocol when the relative humidity of gas flowing out of the desiccant chamber 1220 reaches a second threshold, which is greater than the first threshold, in order to prevent irreversible degradation of the regenerable desiccant material 1222 caused by oversaturation.

When it is desired to regenerate the regenerable desiccant material 1222 by removing adsorbed water, the chemical trace detection system 1100 can initiate the regeneration protocol. In some exemplary embodiments, the system controller 1110 initiates the regeneration protocol automatically when, for example, the relative humidity of gas flowing out of the desiccant chamber 1220 reaches the previously described second threshold. In some exemplary embodiments, the system controller 1110 initiates the regeneration protocol responsively to receiving an initiation signal from the input device 1120. In some embodiments, the system controller 1110 has an internal clock and automatically initiates the regeneration protocol at a particular time of day, which may be adjusted. The particular time to initiate the regeneration protocol may be, for example, a time when there is little, if any, demand for using the chemical trace detection system 1100, e.g., during the hours when an airport is closed or experiences minimal passenger traffic. In some embodiments, the system controller 1110 follows a set calibration routine in which the regeneration protocol initiates after drying a certain volume of air or after a certain number of discrete uses to reduce maintenance requirements. In some embodiments, the system controller 1110 initiates the regeneration protocol depending on the relative humidity of the ambient air, e.g., when the relative humidity of the ambient air is at a minimum to encourage faster uptake of water vapor from the desiccant chamber 1220 to the environment. It should be appreciated that the foregoing triggers for initiating the regeneration protocol are exemplary only, and the regeneration protocol may be initiated based on other triggers.

During the regeneration protocol, the valve 1240 switches to the regenerating state to fluidly uncouple the desiccant chamber 1220 from the IMS 300, preventing water vapor from the regenerable desiccant material 1222 entering the IMS 300 but also cutting off the supply of drift gas to the IMS 300 and rendering the IMS 300 unable to effectively operate during the regeneration protocol. With the valve 1240 in the regenerating state, the heater 1230 heats the desiccant material 1222 to the previously described regeneration temperature, which may be 200° C. to 250° C. and can be adjusted by a user. In some exemplary embodiments, the heater 1230 heats the desiccant material 1222 for a time period, which may be 20 minutes to 2 hours and can be adjusted by a user, during the regeneration protocol. In one exemplary regeneration protocol, the heater 1230 heats the regenerable desiccant material 1222 to a temperature of 225° C. for a time period of between 30 and 40 minutes, depending on various factors such as ambient air temperature, after which the cooler 1231 activates to cool the regenerable desiccant material 1222 for 10 minutes. During the time period, the heater 1230 may cycle on and off to regulate the temperature of the desiccant material 1222. In some exemplary embodiments, the heater 1230 heats the desiccant material 1222 until the relative humidity of gas leaving the desiccant chamber 1220 is below a threshold, such as less than 1% or less than 0.5%. As the heater 1230 heats the regenerable desiccant material 1222, the pump 1210 can continue to operate so water released from the heated desiccant material 1222 is removed from the desiccant chamber 1220 and flows through the valve 1240 to, for example, the environment to leave the chemical trace detection system 1100. In some exemplary embodiments, the pump 1210 may continue to operate during the regeneration protocol after the heater 1230 deactivates in order to purge any remaining water vapor from the desiccant chamber 1220, as well as assist in cooling the desiccant material 1222.

After the desiccant material 1222 reaches the regeneration temperature for a time period sufficient to remove water from the desiccant material 1222, the cooler 1231 can activate in order to return the desiccant material 1222 to the operating temperature, which may be 20° C. to 55° C. It should be appreciated that the operating temperature can depend on a variety of factors, such as the ambient air temperature and the composition of the desiccant material 1222, and the cooler 1231 can be appropriately configured to return the desiccant material 1222 to the operating temperature after heating. In some exemplary embodiments, the pump 1210 continues to operate as the cooler 1231 cools the desiccant material 1222 in order to purge condensed water from the desiccant chamber 1220. In some exemplary embodiments, the regenerable dryer assembly 1200 includes a purging fan 1232 or similar element that is separate from the pump 1210 and is activated to force gas through the desiccant chamber 1220 and purge water from the desiccant chamber 1220 during or after cooling.

After the regenerated desiccant material cools, the system controller 1100 can signal the valve 1240 to switch from the regenerating state to the operating state so the desiccant chamber 1220 and the IMS 300 are fluidly coupled once again. Once the valve 1240 switches to the operating state from the regenerating state, the regeneration protocol can end and the operation protocol may resume so the IMS 300 is supplied with dry drift gas and the chemical trace detection system 1100 can detect one or more substances of interest.

Referring now to FIG. 13, another exemplary embodiment of a regenerable dryer assembly 1300 is shown that has a heater 1330, and may include a cooler 1331, disposed between the pump 1210 and the desiccant chamber 1220 so gas from the pump 1210 is heated (or cooled) prior to entering the desiccant chamber 1220 during the regeneration protocol. In all other respects, the regenerable dryer assembly 1300 can be substantially similar to the regenerable dryer assembly 1200.

Referring now to FIGS. 14-15, another exemplary embodiment of a regenerable dryer assembly 1400 is illustrated that is configured for reverse flow during a regeneration protocol to regenerate the desiccant material. The dryer assembly 1400 is fluidly coupled with an IMS, such as the previously described IMS 300, and includes a pump 1410, a desiccant chamber 1420 holding a regenerable desiccant material 1422, a heater 1430, a first valve 1440, a second valve 1450, and, in some embodiments, a check valve 1460. The pump 1410, which may be a sieve pump, is fluidly coupled to the second valve 1450 by a fluid line 1411, which may be tubing or a similar element. The second valve 1440 is fluidly coupled to a first fluid port 1423 of the desiccant chamber 1420 by another fluid line 1412 and also fluidly coupled to the first valve 1450 by a valve-valve fluid line 1441. In some embodiments, the first fluid port 1423 of the desiccant chamber 1420 is fluidly coupled to the check valve 1460 by a fluid line 1461, with the check valve 1460 opening to, for example, the surrounding environment when fluid pressure in the fluid line 1461 exceeds a threshold.

The heater 1430 contacts or is otherwise associated with the desiccant chamber 1420 to heat the desiccant chamber 1420 and the regenerable desiccant material 1422. In some embodiments, the heater 1430 is a part of a temperature control assembly 1570, illustrated in FIG. 15, that also includes a cooler 1571 associated with the desiccant chamber 1420 to cool the desiccant chamber 1420 and the regenerable desiccant material 1422. The desiccant chamber 1420 has a second fluid port 1424 that is fluidly coupled to the first valve 1440 by a fluid line 1442. The first valve 1440 is fluidly coupled to the IMS 300 by an IMS fluid line 1443 so thy drift gas produced by the regenerable dryer assembly 1400 may flow to the IMS 300 during operation.

Referring specifically now to FIG. 14, the regenerable dryer assembly 1400 is illustrated in an operating mode to provide dry drift gas to the IMS 300. In the operating mode, the first valve 1440 is in an operating state to fluidly couple the second fluid port 1424 of the desiccant chamber 1420 with the IMS 300 and the second valve 1450 is in an operating state to fluidly couple the pump 1410 with the first fluid port 1423 of the desiccant chamber 1420. In the operating mode, the pump 1410 forces gas, such as ambient air, through the second valve 1450 to the desiccant chamber 1420 where the regenerable desiccant material 1422 adsorbs moisture to produce dry drift gas. The produced dry drift gas then flows through the first valve 1440 to the IMS 300. In some exemplary embodiments, the desiccant chamber 1420 is the sole source of dry drift gas for the IMS 300. When the second valve 1450, which may be a three-way valve, is in the operating state, fluid flow to the first valve 1440 through the valve-valve fluid line 1441 is prevented, which is indicated by the valve-valve fluid line 1441 being illustrated as dashed lines in FIG. 14. Thus, gas from the pump 1410 flows through the desiccant chamber 1420 and the first valve 1440 to the IMS 300 when the second valve 1450 is in the operating state, as illustrated by the solid flow arrows from the pump 1410 to the IMS 300.

When the regeneration protocol of the dryer assembly 1400 is initiated, and referring now to FIG. 15, the second valve 1450 switches to a regenerating state and the first valve 1440 switches to a regenerating state. In some embodiments, the valves 1440, 1450 switch from their respective operating state to the regenerating state upon receiving electrical current input to a solenoid, servo, or other electromechanical element of the valves 1440, 1450. In some embodiments, a controller, such as the system controller 1110, supplies electrical current to the valves 1440, 1450 to switch the valves 1440, 1450 between the operating state and the regenerating state. In some embodiments, the valves 1440, 1450 are manually operated to switch between the operating state and the regenerating state by, for example, actuating a lever or similar mechanical element.

The second valve 1450 is directly fluidly coupled to the first valve 1440 and the pump 1410 in the regenerating state and directly fluidly uncoupled from the first fluid port 1423 in the regenerating state. The first valve 1440 is directly fluidly coupled to the second valve 1450 and the second fluid port 1424 of the desiccant chamber 1420 in the regenerating state and fluidly uncoupled from the IMS 300 in the regenerating state. When the regeneration protocol of the dryer assembly 1400 initiates, gas flow from the pump 1410 to the fluid line 1412 and the IMS fluid line 1443 substantially stops, which is indicated in FIG. 15 by these lines 1412, 1443 being illustrated in dashed arrows. Thus, gas flow from the pump 1410 bypasses the desiccant chamber 1420 to the first valve 1440 through the second valve 1450 when the second valve 1450 is in the regenerating state.

During the regeneration protocol, the heater 1430 activates and heats the regenerable desiccant material 1422 in the desiccant chamber 1420 so water evaporates from the desiccant material 1422 and regenerates the desiccant material 1422. The heater 1430 heats the regenerable desiccant material 1422 to a regeneration temperature above 100° C. for a time period that may be several minutes to several hours, depending on, for example, the saturation level of the desiccant material 1422 and the regeneration temperature. Exemplary regeneration temperatures and time periods for the regeneration protocol are previously described in the context of the regenerable dryer assembly 1200.

As water evaporates, gas flow from the pump 1410 enters the desiccant chamber 1420 via the second valve 1450, the first valve 1440, and the second fluid port 1424. As gas flows into the desiccant chamber 1420, the fluid pressure within the desiccant chamber 1420 increases. As the fluid pressure in the desiccant chamber 1420 increases, the fluid pressure in the fluid line 1461 coupled to the check valve 1460 also increases. When the fluid pressure in the fluid line 1461 reaches a threshold pressure level, which may be slightly greater than atmospheric pressure, the check valve 1460 opens to vent the fluid pressure to, for example, the surrounding environment and remove adsorbed moisture from the regenerable dryer assembly 1400. In some embodiments, the check valve 1460 is formed in the desiccant chamber 1420, rather than connected to the desiccant chamber 1420 via the fluid line 1461, but operates in a substantially similar manner.

It should be appreciated that valves other than simple one-way check valves may be used to prevent excessive pressure build-up in the desiccant chamber 1420. In some embodiments, the check valve 1460 is a pressure-relief valve that opens only when fluid pressure in the fluid line 1461 is higher than atmospheric pressure, such as 1.5 atm. In some embodiments, the check valve 1460 is replaced with a valve that periodically vents to the environment based upon a time-dependent cycle of opening and closing, which may be controlled by the system controller 1110. In some embodiments, the check valve 1460 is replaced by a manually controlled valve that may be opened and closed by, for example, a user to relieve fluid pressure in the desiccant chamber 1420.

In some embodiments, the heater 1430 switches off after a time period, such as between about 30 minutes and about 2 hours, and the cooler 1570, which may be a Peltier cooler or high speed fan, activates and cools the desiccant material 1422 to the operating temperature after the regenerable desiccant material 1422 stays at the regeneration period for the time period. The cooler 1570 de-activates after a cooling time period or, in some embodiments, when the regenerable desiccant material 1422 reaches the operating temperature. When the cooler 1570 de-activates, the dryer assembly 1400 may switch to the operating mode, switching the first valve 1440 to the operating state and the second valve 1450 to the operating state. Gas flow from the pump 1410 then proceeds through the desiccant chamber 1420 and produces dry drift gas that flows to the IMS 300, allowing use of the IMS 300. In all other respects, the regenerable dryer assembly 1400 is substantially similar to the previously described dryer assemblies 1200 and 1300.

Compared to known dryer assemblies, the previously described dryer assemblies 1200, 1300, and 1400 offer several benefits. Particularly, the dryer assemblies 1200, 1300, 1400 may be fully automated and able to address drift air humidity issues before they impact the reliability or accuracy of measurements. Also, the dryer assemblies 1200, 1300, 1400 require fewer consumable items, due to the desiccant material 1222, 1422 being regenerable, reducing the operating costs of the dryer assemblies 1200, 1300, 1400. Further, while the IMS 300 is inoperable when dryer assemblies 1200, 1300, 1400 perform the regeneration protocol to regenerate the desiccant material 1222, 1422, the system controller 1110 can be configured to initiate the regeneration protocol during off-peak hours when the IMS 300 would have little, if any, use. Automatically performing the regeneration protocol during off-peak hours allows for frequent regeneration of the desiccant material 1222, 1422 with minimal, if any, need for a "human in the loop" or disruption to operation of the IMS 300. The dryer assemblies 1200, 1300 also have a relatively simple airflow path controlled by a, single valve 1240, which reduces the complexity and expense of the dryer assemblies 1200, 1300. The dryer assemblies 1200, 1300, 1400, therefore, provide automated and economical systems for providing dry drift gas to the IMS 300 with little, if any, meaningful disruption to operation of the IMS 300 or need for a "human in the loop" to address certain periodic maintenance events.

Referring now to FIG. 16, an exemplary embodiment of a method 1610 of operating a chemical trace detection system 1100 including an IMS 300 and a regenerable dryer assembly 1200,1300 is illustrated that, in some embodiments, includes steps 1611, 1612, 1613, 1614, 1615, 1616, 1617, and 1618. The IMS 300 is supplied with dry drift gas by the regenerable dryer assembly 1200, 1300, 1400, as previously described. Step 1611 includes supplying dry drift gas to the IMS 300 from the regenerable dryer assembly 1200, 1300, 1400, which may occur during an operation protocol. When desired, a regeneration protocol is initiated. In some exemplary embodiments, initiating the regeneration protocol occurs responsively to user input, the relative humidity of gas leaving the desiccant chamber 1220, 1420 exceeding a threshold, at a certain time of the day, or at a certain humidity of ambient air in the environment, as previously described. The regeneration protocol includes the steps 1612, 1613, 1614, 1615, and, in some embodiments, 1616. Step 1612 includes stopping the supplying of dry drift gas 1611 to the IMS 300. Step 1612 may include, for example, switching a first valve 1240, 1440 from an operating state to a regenerating state and, in some embodiments, switching a second valve 1450 from an operating state to a regenerating state. Step 1613 includes heating the regenerable desiccant material 1222, 1422 to a regeneration temperature. Step 1614 includes flowing gas through the desiccant chamber 1220, 1420 to force released water from the regenerable desiccant material 1222, 1422 out of the chemical trace detection system 100. Step 1615 includes cooling the regenerable desiccant material 1222, 1422 to an operating temperature. In some exemplary embodiments, step 1616 includes purging remaining water from the desiccant chamber 1220, 1420 after cooling 1615 the regenerable desiccant material 1222, 1422. Step 1617 includes terminating the regeneration protocol and, following step 1617, step 1618 includes resuming supplying the dry drift gas to the IMS 300 from the regenerable dryer assembly 1200, 1300, 1400. Step 1618 may include, for example, switching the first valve 1240, 1440 from the regenerating state to the operating state and, in some embodiments, switching the second valve 1450 from the regenerating state to the operating state. It should be appreciated that the method 1610 can be fully or partially implemented by the previously described system controller 1110 automatically or with input from a user.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements or method steps those elements or steps may be replaced with a single element or step. Likewise, a single element or step to may be replaced with a plurality of elements or steps that serve the same purpose. Further, where parameters for various properties are specified herein for exemplary embodiments, those parameters may be adjusted up or down by 1/20th, $1/10^{th}$, 1/5th, 1/3rd, 1/2nd, and the like, or by rounded-off approximations thereof, unless otherwise specified. Moreover, while exemplary embodiments have been shown and described with references to particular embodiments thereof, those of ordinary skill in the an will understand that various substitutions and alterations in form and details may be made therein without departing from the scope of the invention. Further still, other aspects, functions and advantages are also within the scope of the invention.

What is claimed is:

1. A chemical trace detection system, comprising:

a drift tube;

a desorber comprising:

a desorber body removably coupleable to a sample inlet of the chemical trace detection system, the sample inlet sized to receive the desorber;

a sample holder connected to the desorber body, the sample holder configured to hold a sample trap; and a sample heater carried by the desorber body to desorb a sample contained by the sample trap;

a tube attachment feature associated with the sample inlet couplable to the desorber;

a detector disposed within the drift tube;

a voltage source to produce an electrical field in the drift tube; and an ionizer to establish an ionization region adjacent to the electrical field;

wherein insertion of the desorber in the sample inlet couples the tube attachment feature with the desorber to hold the sample in or adjacent to the ionization region and the sample heater associated with the desorber desorbs particles of the sample held in the sample holder of the desorber such that the desorbed particles are introduced directly into the ionization region from the sample holder to form ionized molecules that are forced toward the detector by the electrical field.

2. The chemical trace detection system of claim 1, wherein the sample heater is a resistive heater including electrical contacts.

3. The chemical trace detection system of claim 2, wherein the electrical contacts extend to an exterior surface of the desorber body.

4. The chemical trace detection system of claim 1, wherein the desorber body defines a fluid flow channel with two or more channel openings formed in an exterior surface of the desorber body.

5. The chemical trace detection system of claim 1, the desorber further comprising a desorber attachment feature to removably mate with the tube attachment feature.

6. The chemical trace detection system of claim 1, wherein the desorber body is defined between a first end and a second end opposite the first end, the sample holder being located at the second end.

7. The chemical trace detection system of claim 1, the desorber further comprising a cooling opening to dissipate heat from the desorber.

8. The chemical trace detection system of claim 1, the desorber further comprising a gripping region for a user to grip.

9. The chemical trace detection system of claim 2, wherein the sample heater is a resistive heater in electrical contact with a desorber contact and the drift tube includes a drift tube contact in electrical contact with a current source.

10. The chemical trace detection system of claim 9, wherein the sample heater heats the sample in the sample holder when the desorber contact draws electrical current from the current source via the drift tube contact.

11. The chemical trace detection system of claim 1, wherein the desorber further includes the sample trap containing a collected sample held in the sample holder.

12. The chemical trace detection system of claim 11, wherein the sample trap includes at least one of a swab, an adsorbent pad, or an adsorbent sheet.

13. The chemical trace detection system of claim 1, further comprising an ionization chamber including a plurality of chamber walls defining a chamber volume containing the ionizer.

14. The chemical trace detection system of claim 13, wherein the desorber is disposed within the chamber volume between the ionizer and the ionization region.

15. The chemical trace detection system of claim 14, wherein the ionization chamber is coupled to the drift tube.

16. The chemical trace detection system of claim 1, wherein the drift tube defines a tube volume and the ionizer is disposed within the tube volume.

17. The chemical trace detection system of claim 16, wherein the ionizer is directed at the detector.

18. The chemical trace detection system of claim 1, wherein the sample holder is connected to the sample heater.

* * * * *